(12) United States Patent
Dillon

(10) Patent No.: US 9,442,564 B1
(45) Date of Patent: Sep. 13, 2016

(54) MOTION SENSOR-BASED HEAD LOCATION ESTIMATION AND UPDATING

(71) Applicant: Amazon Technologies, Inc., Seattle, WA (US)

(72) Inventor: Michael Joseph Dillon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 43 days.

(21) Appl. No.: 14/620,494

(22) Filed: Feb. 12, 2015

(51) Int. Cl.
*G06F 3/01* (2006.01)
*G06F 3/0346* (2013.01)

(52) U.S. Cl.
CPC ............ *G06F 3/012* (2013.01); *G06F 3/017* (2013.01); *G06F 3/0346* (2013.01)

(58) Field of Classification Search
CPC ................ G02B 27/0179; G02B 27/017
See application file for complete search history.

(56) References Cited

U.S. PATENT DOCUMENTS

| | | | | |
|---|---|---|---|---|
| 2006/0045294 A1* | 3/2006 | Smyth | ............ | H04S 7/304 381/309 |
| 2008/0129688 A1* | 6/2008 | Richardson | ......... | G06F 3/04815 345/156 |
| 2009/0147993 A1* | 6/2009 | Hoffmann | ............ | G02B 27/017 382/103 |
| 2010/0149073 A1* | 6/2010 | Chaum | ............. | G02B 27/0093 345/8 |
| 2014/0219485 A1* | 8/2014 | Jensen | ............... | G01C 21/3629 381/313 |
| 2014/0313295 A1* | 10/2014 | Dolim | ....................... | G06F 3/01 348/51 |
| 2015/0005587 A1* | 1/2015 | Qu | ....................... | A61B 5/4023 600/301 |
| 2015/0046116 A1* | 2/2015 | Eatwell | ................. | G01L 5/0052 702/150 |
| 2015/0116316 A1* | 4/2015 | Fitzgerald | ............. | G02B 27/01 345/419 |
| 2015/0223725 A1* | 8/2015 | Engel | ..................... | A61B 5/065 600/417 |
| 2016/0128587 A1* | 5/2016 | Kuenen | ................. | A61B 5/031 600/301 |

* cited by examiner

*Primary Examiner* — Ricardo L Osorio
(74) *Attorney, Agent, or Firm* — Ilan Barzilay; Seyfarth Shaw LLP

(57) ABSTRACT

A device that operates a user interface (UI) that depends on the position of the user's head. The device estimates the head position using motion sensors. The device establishes an initial estimated position of the head and tracks the device's movement from an initial reference position to determine the new position of the head. If the head crosses a position threshold the device may partially re-center the head to avoid large errors.

20 Claims, 28 Drawing Sheets

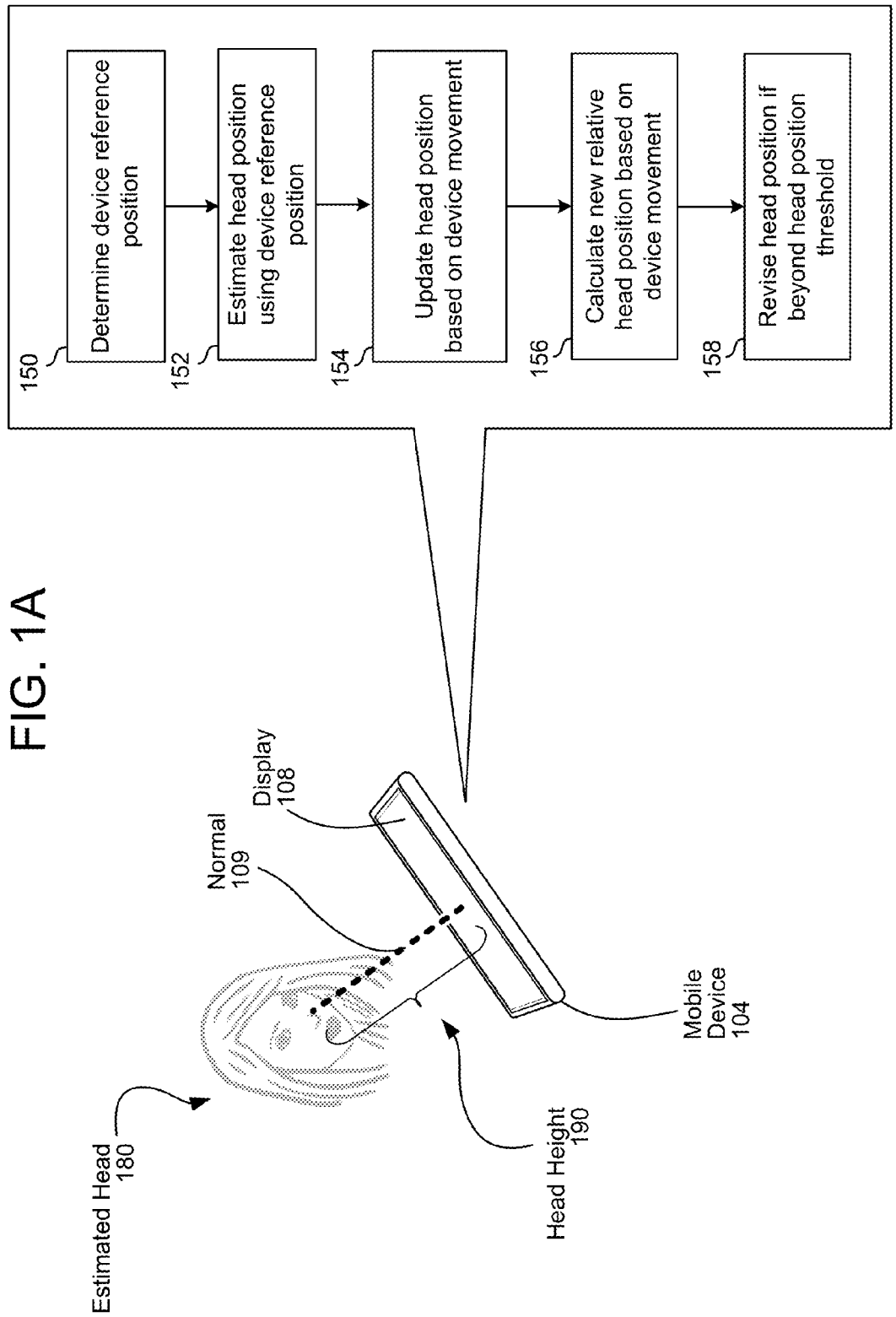

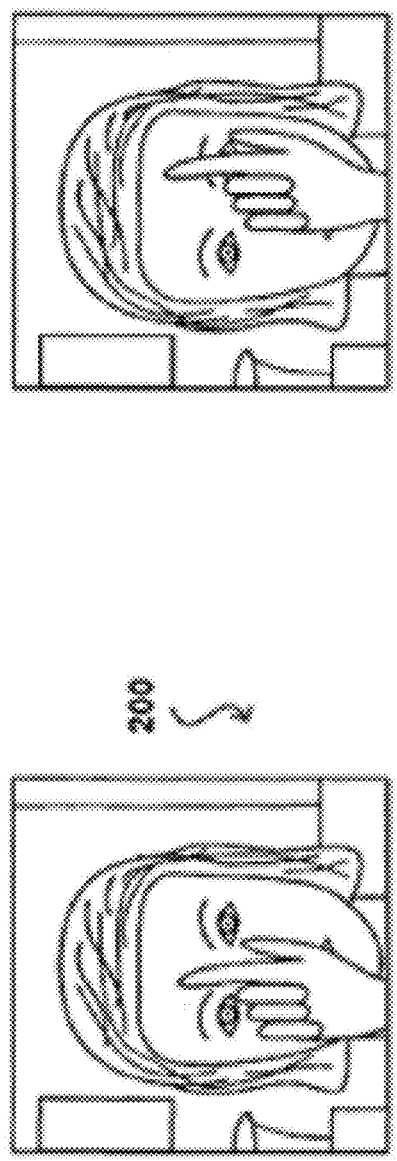
FIG. 2A
FIG. 2B
FIG. 2C

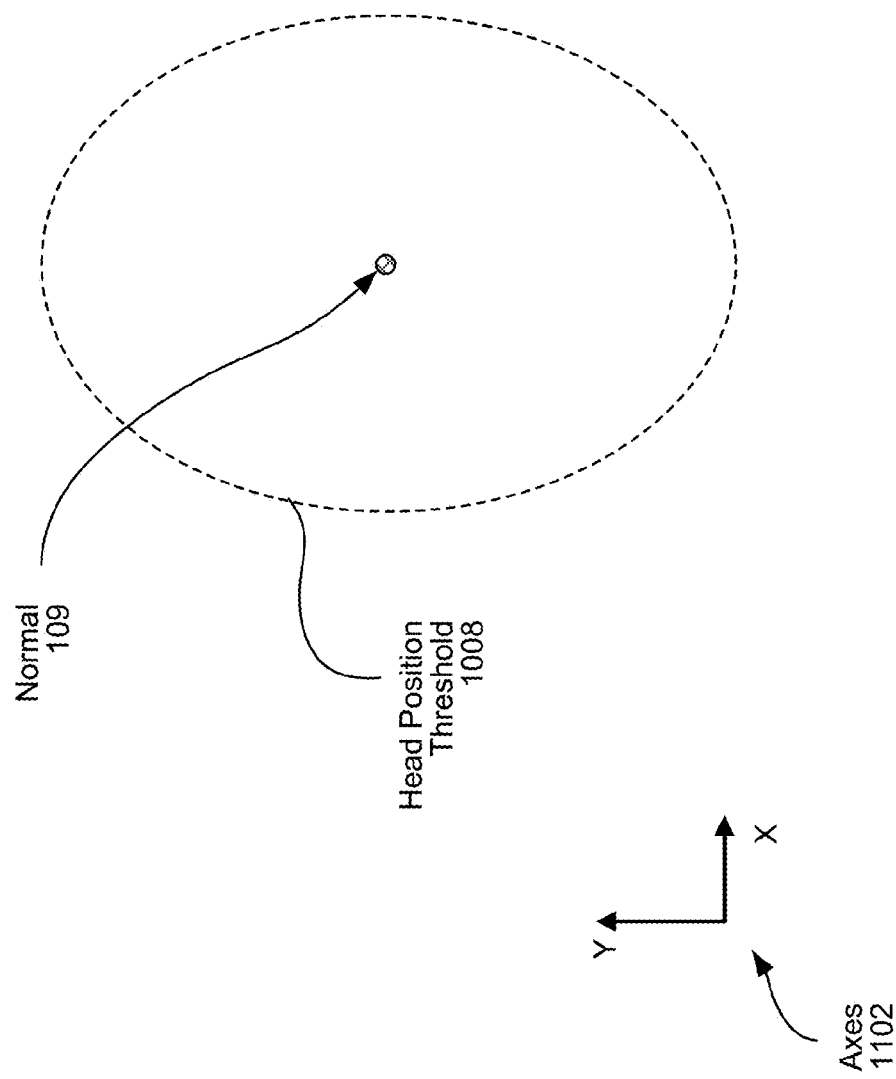

MOTION SENSOR-BASED HEAD LOCATION ESTIMATION AND UPDATING

BACKGROUND

Handheld electronic devices regular include navigation capability and often include features to determine device orientation or other internal sensors. Some devices have multiple radios, including WiFi and Bluetooth. Many also provide a graphical user interface (GUI) and touch screen via which the user may interact with the GUI.

BRIEF DESCRIPTION OF THE DRAWINGS

For a more complete understanding of the present disclosure, reference is now made to the following description taken in conjunction with the accompanying drawings.

FIG. 1A illustrates a system for tracking an estimated location of a user's head in accordance with various embodiments.

FIGS. 2A-2C illustrate stereoscopic image data that can be captured in accordance with various embodiments.

FIG. 11 illustrates a head position threshold according to various embodiments.

DETAILED DESCRIPTION

Certain computing devices may be configured with position based user interfaces. Such position based user interfaces may alter their appearance based on a user position relative to the device operating the user interface (UI). Such devices may determine relative user position using a number of techniques, include head detection. If a user's head is detected directly in front a device, graphical elements of the UI (such as icons, images, etc.) may display normally (as in a head on view). When a user's head is detected askew from the device, for example to the left or right by some amount, the UI may alter its display to show graphical elements or other content of the UI as if from an angle. In this manner the UI may create certain visual effects such as three dimensional (3D) effects, parallax, depth of UI graphical elements, or other effects.

Certain devices, as explained below, may be equipped with front-facing cameras or other image detection components that may be used to determine the position of the user's head. Other devices, however, may not be equipped with such front-facing cameras, or may be unable to use such front-facing cameras for various reasons, such as objects interfering with the cameras, low power conditions, camera failure, etc. Thus, it is desirable to have a system for determining, or at least estimating, the position of the user's head so that a UI or other applications that rely on the head position may still function on camera-limited devices.

Offered is a method and system for estimating, tracking, and revising a user's head position using motion sensors of a device. Such motion sensors may include, for example, a gyroscope or other sensor as described below. The motion sensors are used to determine an initial device position, and from that initial device position, an initial estimated head reference position located at a certain fixed distance perpendicular to the plane of the display of the device. As the device moves the head is assumed to remain at the same fixed distance from the device in space, albeit at a different relative position as the device position changes due to rotation, etc. As the device moves, it tracks and updates the head position relative to the device by determining where the head would be if it had remained stationary, but the device itself had moved. As the device tracks the head position, the device may continually output the head location so that a position dependent UI or other application may continue to operate as if the head were in the head location. If the head position is ever determined to be beyond a certain head position threshold, the device may revise or correct the head position by changing the estimated head location to one closer to a reset position which is located perpendicular to the device display at the fixed distance.

Figure 1B:
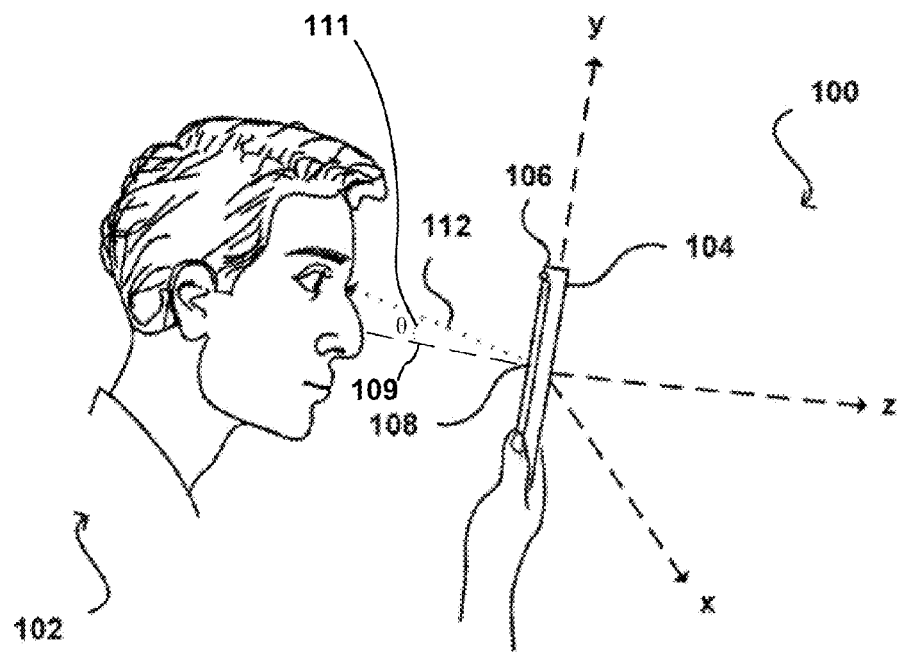
FIGS. 1B-1J illustrate an example approach for detecting and tracking a user in relation to a device in accordance with an embodiment.

FIG. 1A illustrates a system for such sensor based head-tracking. As shown, a device 104 has a screen 108. The device may or may not have cameras capable of detecting the user's head, but for the present illustration no cameras are used, so none are illustrated for FIG. 1A. The device 104 determines (150) a device reference position by taking the output from motion sensors of the device 104 at a first time. That output is used to determine the reference position. The device 104 then estimates (152) an initial estimated reference position of the user's head (180) relative to the reference position. The estimated head reference position is placed at a fixed distance (for example between 300-400 mm) away from the center of the screen 108 of the device 104 (on the side of the screen, where the estimated head 180 would likely be). That fixed distance is indicated in FIG. 1A as head height 190. The estimated head reference position is located along the normal 109, which is a line perpendicular to the screen 108. The normal 109 thus aligns with a reference Z-axis of the device (as discussed below in reference to FIG. 1B). Thus, the initial estimated head position is a fixed distance perpendicular to the center of the screen 108.

The device 104 may then assume that the head remains the head height 190 away from the center of the device 104 as the device moves and rotates. As an illustration, the head position as the device moves may be thought of as attached to the center of the device 104 by a string of head height 190. As the head moves, its relative position (i.e., the X, Y, and/or Z position) to the center of the plane of the screen 108 may move, but its distance from the center of the device is assumed not move.

As the device 104 detects movement from its sensors, it may accumulate sensor output and update (154) its own position relative to the initial device reference position. Using its updated position, the device calculates (156) a new relative head position, based on how the device moved relative to the estimated head reference position. If the new head position is beyond a head position threshold, meaning the device now calculates that the movement has been significant enough that the head is at a sharp angle from the screen 108, the device may revise (158) the new head position. That is, the device may assume a different position for the head, one that is closer to a reset position located along the normal 109. The device may continue to revise the head position until the revised head position is close enough to a reset position (as explained further below in reference to FIGS. 17-18). Thus the device may correct for large estimated head movements.

While the device is calculating and/or revising different head positions, it may be outputting the head position so the head position may be used by the UI and/or other applications that rely on the head position.

While performing estimated head tracking using sensors (as described in FIGS. 1A and 9-20) may not be as precise or accurate as head tracking using a camera based system (as described in FIGS. 1B-9), it provides a less resource intensive method of performing head tracking, as well as a method of head tracking available to devices without a camera based head tracking system.

Various other functions and advantages are described and suggested below in accordance with the various embodiments for user interfaces using camera based and sensor based head tracking.

Various embodiments involve determining a position of a user with respect to a device, such as by analyzing image data utilizing a user detection process, and tracking the user by combining the results of one or more tracking processes and/or other motion detection processes, such as determined by inertial sensors (e.g., accelerometer, gyroscope, inclinometer, and/or magnetometer). As there are not necessarily any dependencies between image-based tracking and inertial sensor-based motion detection, the two approaches can be complementary. The failure of one approach may not result in failure of the entire tracking system. For instance, image-based tracking can be computationally costly and may incur an undesirable amount of latency. Inertial sensor-based motion detection, on the other hand, has relatively lower latency but can be subject to drift over time. By combining image-based tracking and inertial sensor-based motion detection, the tracking system in the aggregate may not be subject to deficiencies of conventional approaches that use one particular approach alone.

In some embodiments, one detection and/or tracking process can be used as a primary or predominant approach and the other technique(s) may be used as the secondary detection and/or tracking approach(es) to the extent the primary or predominant approach fails to detect and/or track the user. For example, the secondary detection and/or tracking approach(es) may be executed only if the probability, confidence level, error rate, or other such metric corresponding to the estimated position of the user as determined by the primary detection and/or tracking approach is below a threshold value. As another example, one particular detection and/or tracking process may be highly accurate but computationally expensive and a second detection and/or tracking process may be less processor-intensive but less accurate from a "cold start" yet highly effective when the initial user position is known. The device can be configured to use the first detection and/or tracking process to detect the user and track the user using the second detection and/or tracking process thereafter.

In some embodiments, input data from inertial sensors or other input devices can be used to optimize an object tracking system. For example, device motion data captured by one or more inertial sensors can be used as a cue for where to begin detecting and/or tracking of the user in image data or to limit regions of the image data for detecting and/or tracking the user. As another example, a device may be equipped with an ambient light sensor that can capture the amount of ambient light in the environment in which the device is being used. Certain detection and/or tracking processes may be more sensitive to illumination conditions than others, and such processes may be selected (or not selected) for detecting and tracking a user and/or such processes can be weighted based on the determined amount of ambient light.

In some embodiments, multiple image-based user detection and/or tracking processes can be executed simultaneously, other motion determination techniques can be performed, and/or other sensor data analyzed for detecting and tracking a user. The data obtained by these independent processes can be aggregated for more robustly detecting and tracking a user. In various embodiments, sensor fusion techniques can be used to combine data from multiple sensors of a computing device. Sensor fusion can be used to aggregate data captured by multiple sensors or input devices, such as multiple cameras, inertial sensors, infrared transceivers, GPS, microphones, etc., to obtain information of a state of an object of interest that may be more accurate and/or complete than would be possible from a single sensor alone. For example, conventional cameras may be limited to capturing 2-D images of objects of interest. However, images captured by multiple cameras with different fields of view can be used to analyze the object of interest in three dimensions. As another example, a conventional three-axis accelerometer may be limited to measuring linear acceleration about three dimensions (e.g., x-, y-, and z-axis) while a three-axis gyroscope may be limited to measuring rotational acceleration about three dimensions (e.g., roll, pitch, and yaw). By implementing sensor fusion, the sensor data captured by the accelerometer and the gyroscope can be used to derive motion according to six dimensions or six degrees of freedom (6DOF). As yet another example, sensor fusion can be applied to aggregate motion and/or position of an object of interest evaluated using image analysis and motion and/or position derived from inertial sensor data.

In some embodiments, a probabilistic system can be created that models the physics of user motion, device motion, and image capturing by cameras of the device. The probabilistic system can define as inputs probability estimates of user position and/or orientation from the camera(s) of the device, probability estimates of device position and/or orientation from the inertial sensor(s) of the device, and/or other probability estimates. The probabilistic system can define the position and/or orientation of the user with respect to the computing device as the output based on a maximum likelihood estimation (MLE) approach. Sensor fusion techniques and probabilistic approaches can include Kalman filtering, extended Kalman filtering, unscented Kalman filtering, particle filtering, among others.

FIGS. 1B-1J illustrate an example approach of detecting and tracking a user in accordance with an embodiment. As shown in system 100 of FIG. 1B, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 106 located on the front of the device and the on same surface as the display screen to capture image data of subject matter facing the front of the device, such as the user 102 viewing the display screen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors, or other types of motion/orientation determination elements, such as accelerometers, gyroscopes, magnetometers, inclinometers, proximity sensors, distance sensors, depth sensors, range finders, ultrasonic transceivers, among others.

In this example, a vector 112 is shown from a point at the center of the display screen 108 to a point on the head of the user 102, such as between the user's eyes. Vector 112 is a three-dimensional vector that can be initially determined, for example, using a facial detection process performed on the image(s) captured by the camera(s) 106. In other embodiments, the vector can be determined using sensors or other input devices of a computing system, such as inertial sensors or proximity sensors. In still other embodiments, the vector can be determined by estimating a head position as described above in reference to FIG. 1A and as described below. In at least some embodiments, vector 112 can be used by the device to smoothly animate content displayed on the screen 108 to compensate for a change in perspective of the user with respect to the screen. In other embodiments, multiple vectors can be determined between the computing device and various features of the user, such as the user's eyebrows, eyes, irises, pupils, or mouth. In still other embodiments, other representations or models can be used to define the relationship between the user and the computing device, such as primitive geometric shapes (e.g., rectangle, ellipse, triangles, cylinders, ellipsoids), contours (e.g., edges comprising the boundaries of the user's head or face), silhouettes (e.g., regions within the contours of the user's head or face), etc. A head angle 111 ($\theta$) may be measured that indicates an angle of the user's head relative to a normal 109 to the plane of the display 108 of the device 104. The normal 109 is perpendicular to the plane of the display 108 and may extend from the center of the display 108. The angle of the user's head relative to the display 108 may be measured based on the head angle 111 between the normal 109 and the vector 112. The user interface may be rendered based on the vector 112 and/or the head angle 111. If the user's head is directly in front of the display (i.e., the center of the user's head aligns directly with the normal 109), the head angle 111 would be zero. As can be appreciated, the farther the user's head moves from the normal 109, the greater the head angle 111 becomes. As the position of the user's head changes relative to the device and/or relative to the normal to the plane of the display of the device, the user interface may be rendered and displayed differently.

Figure 1C:
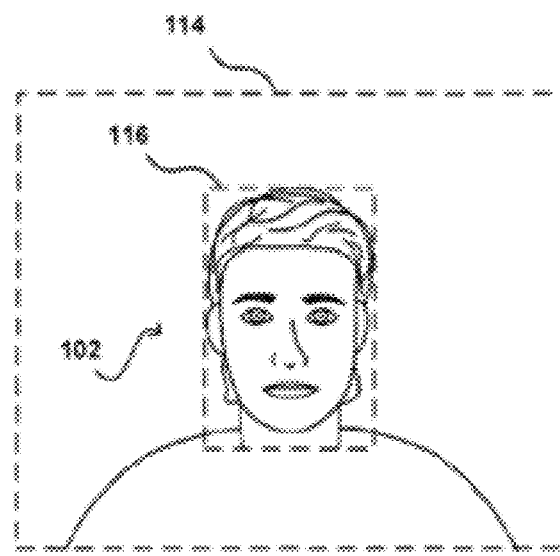
Figure 1D:
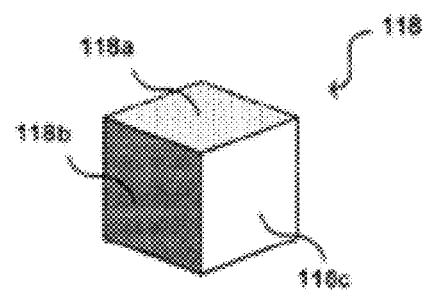

As illustrated in FIG. 1C, when the user 102 positions the computing device 104 directly in front of himself and gazes towards the display screen 108 straight on (i.e., the x-y plane of the device is parallel or substantially parallel to the user, where the lateral axis corresponds to the x-axis, the longitudinal axis corresponds to the y-axis, and the depth of the device or vertical axis corresponds to the z-axis), the image data captured by the camera 106 of the device can encompass the image 114. Although one image is shown to be captured in this instance, it will be appreciated that multiple images captured by a same camera at different times, multiple images captured by multiple cameras at a same time, or some combination thereof can be analyzed in various embodiments. Further, other embodiments may use other approaches, such as proximity sensors, to detect an object of interest with respect to a computing device. In this example, a user detection process is adapted for locating the head or face of a person. Here, the user detection process locates the head or face of the user 102 within the image 114 and provides as output the dimensions of a bounded box 116 indicating where the head or the face of the user is located in the image. In this example, the device is capable of rendering one or more three-dimensional graphical elements for display on the two-dimensional display screen 108 according to a first view or perspective of the user with respect to the display screen. The device relies on the pose of the head or face of the user with respect to the device and/or apparent motion of the user's head or face with respect to the device, as defined by vector 112, to render an appropriate perspective of a 3-D object as 2-D image data as illustrated in FIG. 1D, here, a cube 118 with a top surface 118a, a left front-facing surface 118b, and right front-facing surface 118c. The front-facing surfaces 118b and 118c appear to be equal in scale when the user gazes upon the display screen 108 straight on.

Figure 1E:
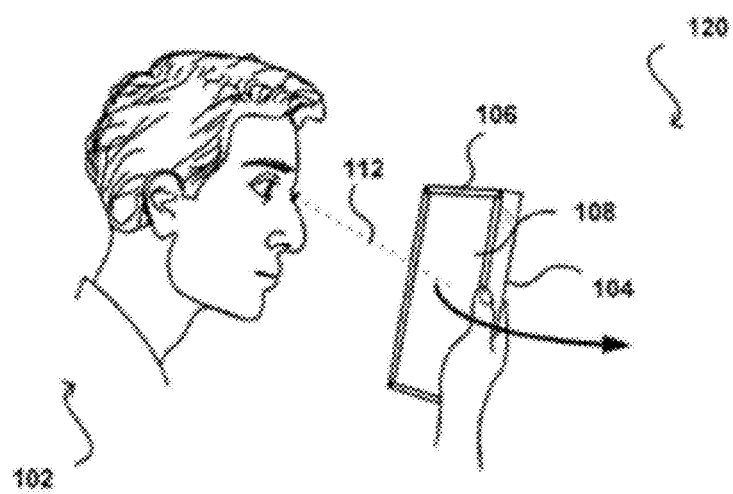
Figures 1F, 1G:
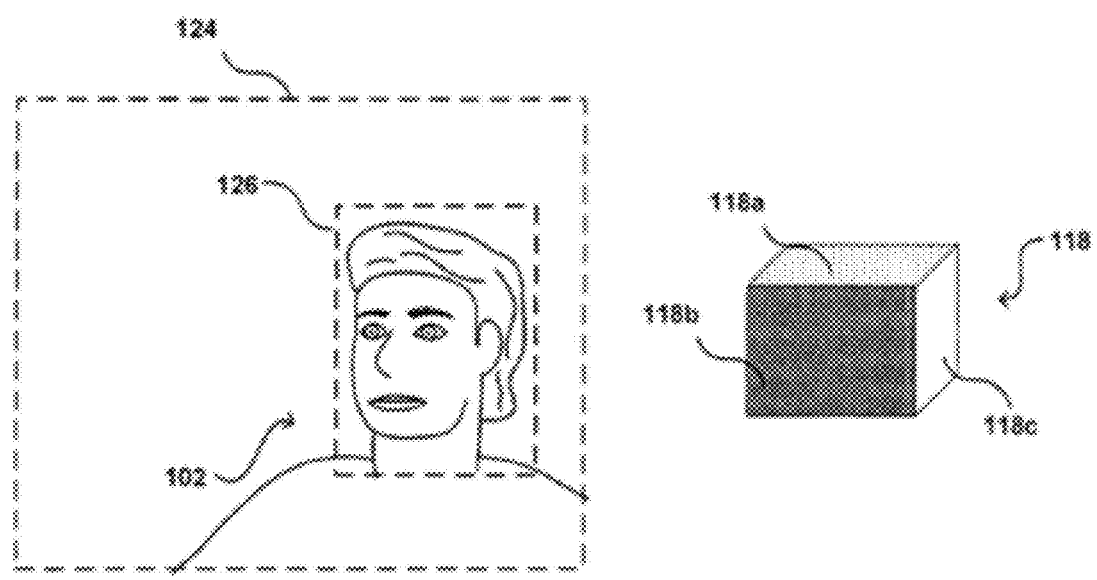

In FIG. 1E, an example situation 120 illustrates that the user 102 has tilted the computing device 104 to the right with respect to the perspective of the user, i.e., the user has rotated the device to his right about the longitudinal or y-axis, to obtain a second view or perspective of the 3-D object 118 depicted in FIG. 1G. As seen in FIG. 1F, the tilt or rotation of the device causes the camera 106 to capture a different view or perspective of the user within image 124, here, a three-quarters profile of the head or face of the user facing leftward. The position of the user's face may also be shifted towards a right region of the image because of the tilt or rotation of the device. In this example, the apparent motion of the face or head of the user (which is primarily due to the motion of the device) is tracked from the initial position detected in FIG. 1C to the new position depicted in FIG. 1F. For instance, the 3-D vector 112 between the point between the user's eyes and the center of the front face of the device is recalculated based on the new position and orientation of the user with respect to the computing device. Based on the apparent movement of the user's head or face, the 3-D object 118 is re-rendered for display on the display screen 108 to correspond to the new perspective of the user 102. For example, as the user tilts the device rightward, the device will render and/or animate the 3-D cube 118 such that the left front-facing surface 118b of the cube appears more prominently on the display screen and the right front-facing surface 118c appears at a more oblique angle.

Figure 1H:
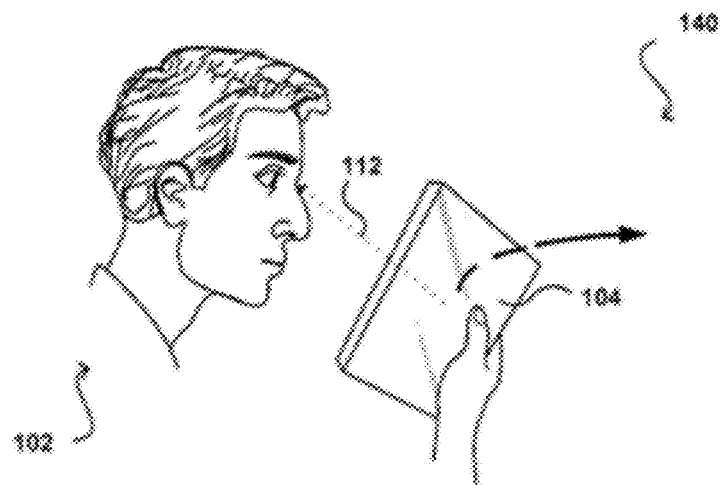
Figure 1I:
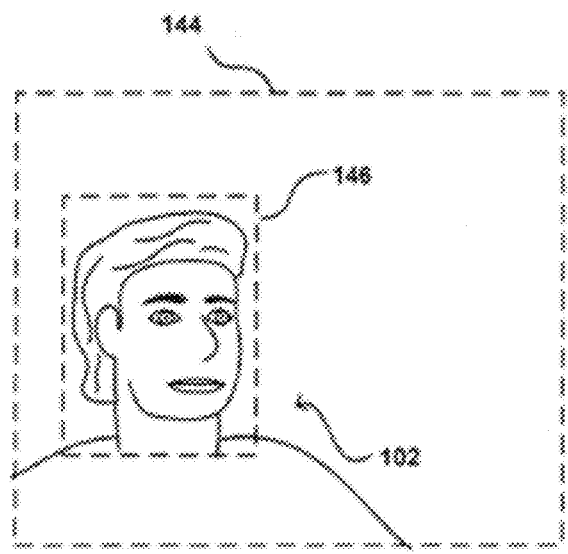
Figure 1J:
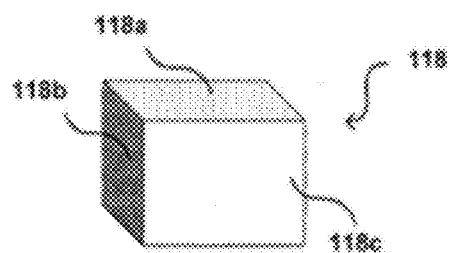

In FIG. 1H, an example situation 140 illustrates that the user 102 has tilted the computing device 104 to the left with respect to the perspective of the user, i.e., the user has rotated the device to his left about the longitudinal or y-axis, to obtain a third view or perspective of the 3-D object 118. As seen in FIG. 1I, the tilt or rotation of the device causes the camera 106 to capture a three-quarters profile of the head or face of the user facing rightward, and the position of the user's face has also shifted towards a left region of the image. In this example, the apparent movement of the face or head of the user (which, again, is primarily due to the motion of the device) is tracked from a previous position to the new position depicted in FIG. 1I. The 3-D object 118 can be re-rendered for display on the display screen 108 based on the apparent motion of the user's head or face. For example, as the user tilts the device towards his left from the position depicted in FIG. 1E, the box will transition or be animated from the perspective seen in FIG. 1G to the perspective seen in FIG. 1D when the x-y plane of the device is parallel or substantially parallel to the user. As the user continues rotating the device towards his left, the 3-D cube 118 will transition or be animated from the perspective seen in FIG. 1D to the perspective seen in FIG. 1J wherein the right front-facing surface 118c of the cube 118 appears more prominently on the display screen and the left front-facing surface 118b appears at a more oblique angle. When the user tilts the device forward (i.e., rotating the device about the x-axis such that the top portion of front of the device is further away from the user and the bottom portion of the front of the device is closer to the user), details of a bottom surface (not shown) of 3-D cube 118 may be displayed and the top surface 118a may be hidden. Likewise, tiling the device backwards (i.e., rotating the device about the x-axis such that the top portion of the front of the device is closer to the user and the bottom portion of the front of the device is farther from the user), will cause the top surface 118a to be displayed more prominently. It will be appreciated that objects, such as the head or face of the user, can generally be tracked according to six degrees of freedom (e.g., motion along the x-, y-, and z-axes or forward/backward, up/down, and left/right, and rotation about the x-, y-, and z-axes or pitch, yaw, and roll) and the device can be configured to appropriately respond to such various motions. For example, when the user tilts the device backwards and to his right (i.e., such that the top left corner of the device is the closest point of the device to the user), the top surface 118a and left front-facing surface 118b of the cube may be displayed more prominently and the right front-facing surface 118c may be appear at a more oblique angle and the bottom surface may remain hidden. When the user tilts the device forward and towards his left (i.e., such that the bottom right corner of the device is the closest point of the device to the user), the bottom surface and right front-facing surface 118c can be displayed with more details, and the top surface 118a and left front-facing surface 118b may appear more obscured or hidden.

As mentioned, in some embodiments, tracking of the vector (or other representation of a user) can be based on analyzing the change in position and/or orientation of the user between a first image, such as image 114 of FIG. 1C, and a second image, such as image 124 of FIG. 1F. For example, one or more cameras of a device can be calibrated in order to recover 3-D quantitative measures about an object of interest represented in 2-D images captured by the camera(s), such as a distance of the object of interest from the device, the height of the object of interest, etc. Various approaches can be used for camera calibration, such as direct linear transformation (DLT); the algorithm set forth in Tsai, Roger, "A versatile camera calibration technique for high-accuracy 3D machine vision metrology using off-the-shelf TV cameras and lenses," Robotics and Automation, IEEE Journal of 3, no. 4 (1987): 323-344; and the algorithm set forth in Zhang, Zhengyou, "A flexible new technique for camera calibration," Pattern Analysis and Machine Intelligence, IEEE Transactions on 22, no. 11 (2000): 1330-1334, each of which are incorporated herein by reference.

In other embodiments, tracking of the vector can be based on input data captured using one or more sensors or other input devices of a computing system. For instance, a proximity sensor can be used to estimate an initial position of an object of interest with respect to the device. An accelerometer can measure the acceleration of a device and the change in the position of the device can be derived via double integration of the data obtained from the accelerometer. A gyroscope can measure the rate of change of the device's orientation (i.e., angular velocity) and the change in angular position of the device can be calculated by integration of the measured velocity. Fusion of the input data obtained by the accelerometer and gyroscope may provide updated dimensions of the vector between the user and the computing device.

In still other embodiments, a combination of image-based tracking and tracking by inertial sensors can be used to track an object of interest. As mentioned, image-based tracking and inertial sensor-based tracking can be complementary. For example, inertial sensors may not be capable of differentiating between a change in inclination of a device from acceleration of the device. Further, there may be greater uncertainty associated with measurements by inertial sensors at slow motion than at high velocities. That is, inertial sensors may be more accurate at very high velocities and accelerations but less accurate at lower velocities and accelerations. Cameras and other imaging elements, on the other hand, can track features of an object of interest accurately at low velocities. However, image-based tracking may be less accurate at higher velocities due to motion blur and the effect of camera sampling rate. In addition, for high velocities and accelerations, cameras with higher frame rates may be bandwidth-limited by real time tracking requirements. It may also be difficult to distinguish motion due to translation and motion due to translation for certain objects of interest. Further, a near object of interest with low relative speed can appear the same as an object of interest further away with high relative speed.

In addition to the complementary characteristics of inertial sensors and cameras, differences between inertial sensor-based track and image-based tracking may also exist in relation to the processing requirements of these tracking approaches. Inertial sensor-based tracking may be less computationally expensive than image-based tracking because position information can be derived in constant time from data captured by inertial sensors while image-based track requires processing of at least a portion of a captured image. Image-based tracking, however, can be more reliable than inertial sensors in determining a position of a user with respect to a device in certain instances. For example, if a device remains stationary but a user tilts his head, inertial sensors will indicate no change in position of the user with respect to the device. Image-based tracking, on the other hand, may be more likely to detect the motion of the user with respect to the device. As another example, a user may be operating a device in a moving vehicle. Inertial sensors may indicate that the device is moving according to the direction of the vehicle even though the user may remain stationary with respect to the device. Image-based tracking can be more reliable in determining the position of the user with respect to the device in such a scenario.

In various embodiments, aggregation of image-based tracking and inertial sensor-based tracking can be loosely coupled or tightly coupled. A loosely coupled approach can comprise independent imaging and inertial navigation systems, running at different rates, and exchanging information. Translational and angular velocity estimates from the inertial sensors can be used to predict device motion, and velocity estimates from image-based tracking can be used to bound integration errors in the inertial sensors. Prediction of device motion can make the feature correspondence process more robust and can reduce the search space, thus reducing processing and use of power. A tightly coupled approach combines raw data of the cameras and inertial sensors in a single, optimum filter, such as a Kalman filter or a particle filter, as discussed further elsewhere herein.

In certain situations, a user may remain stationary or a device will be moved such that movement of the user's face or head may be negligible relative to the motion of the device. In such situations, it may be preferable to use motion data detected by the inertial sensors of the device for tracking the position and orientation of the user after the user has initially been detected in image data. In some embodiments, a user's change in position can be determined primarily based on motion data detected by the device's inertial sensors. For example, in one embodiment, the motion data detected by the inertial sensors can be sampled at a rate of 100.0 ms to update the user's position with respect to the device, and image data can be sampled at a rate of every 5.0 s to ensure that the user's position as determined by the inertial sensors do not substantially drift from the user's actual position. An advantage of such an approach would be to reduce the amount of processing that may be required by image-based tracking and conserve the battery life of the computing device. In other cases, image-based tracking can be used as the predominant approach for tracking the position if the user with respect to the device, and motion detected by inertial sensors can be used as backup in the event image-based tracking fails. For instance, lighting may temporarily go out or the user may otherwise be temporarily occluded such that an image-based tracking process is unable to track the user. In such instances, motion data captured by inertial sensors can be used to extrapolate the position of the user until the tracking process is able to re-track the user or a user detection process is executed to reinitialize the user's position with respect to the device.

In various embodiments, input data from inertial sensors or other input devices can be used to improve a tracking system. In some embodiments, motion data captured by inertial sensors can be used to improve performance of image-based tracking. For example, the relative position and orientation of a computing device can be derived from the inertial sensor data when a user moves the computing device. Techniques for determining the position and orientation of a computing device from inertial sensor data is well known in the art and will not be discussed herein detail. The position and orientation obtained from the inertial sensors can be used to limit one or more regions of the image data to be analyzed by an image-based tracking process, which can optimize the image-based tracking process by circumscribing the image data needed to be searched by the image-based tracking process. Certain tracking processes track an object when a sufficiently good model of the object has been found, i.e., one with sufficiently small error. Computation time can be saved for such processes by initializing the tracking process to begin searching for the object at an expected position based on the inertial sensor data.

In some embodiments, an ambient light sensor can be used to improve performance a tracking system. For instance, certain image-based tracking processes may be more sensitive to changes in illumination than other tracking processes. When the amount of light determined by the ambient light sensor is determined to meet or exceed a threshold value, an illumination-sensitive tracking process can be selected as the primary tracking process and/or the illumination-sensitive tracking process can be weighted greater based on illumination conditions. Alternatively, when the amount of ambient light of the current environment is below a threshold value, illumination-sensitive tracking processes may be excluded as the primary tracking process or such processes can be weighted less.

In some embodiments, a proximity sensor, depth sensor, distance sensor, structured lighting transceiver, and the like can be used to improve the robustness of a tracking system. For example, certain tracking processes capable of tracking an object in three-dimensional space can be more accurate with the distance or depth information provided by the proximity sensor, depth sensor, distance sensor, or structured lighting transceiver. In other embodiments, three-dimensional or stereoscopic image information can be captured using multiple cameras to provide three-dimensional point data, or disparity information that can be used to determine motion in three dimensions. FIGS. 2A and 2B illustrate images 200 and 220 that could be captured using a pair of cameras (e.g., stereoscopic cameras) embedded in a computing device. In various embodiments, the pair of cameras may capture the images simultaneously or substantially simultaneously and therefore would include at least some matching points of interest in their respective images. For example, the user's finger, nose, eyes, eyebrows, lips, or other features may be detected or tracked by the computing device in both images by using the various techniques discussed elsewhere herein. FIG. 2C illustrates an example combination image 240 showing the relative position of various objects in the captured images 200 and 220 if those images were "overlaid" or "superimposed" the amount of disparity, or lateral offset, between objects in the images. Objects closer to the device, such as the finger, have relatively large amounts of disparity. Objects farther away from the device, such as a painting on the wall, have relatively small amounts of disparity. Objects between these two areas will have intermediate amounts of disparity based upon the relative distance of those objects from the cameras.

Figure 3:
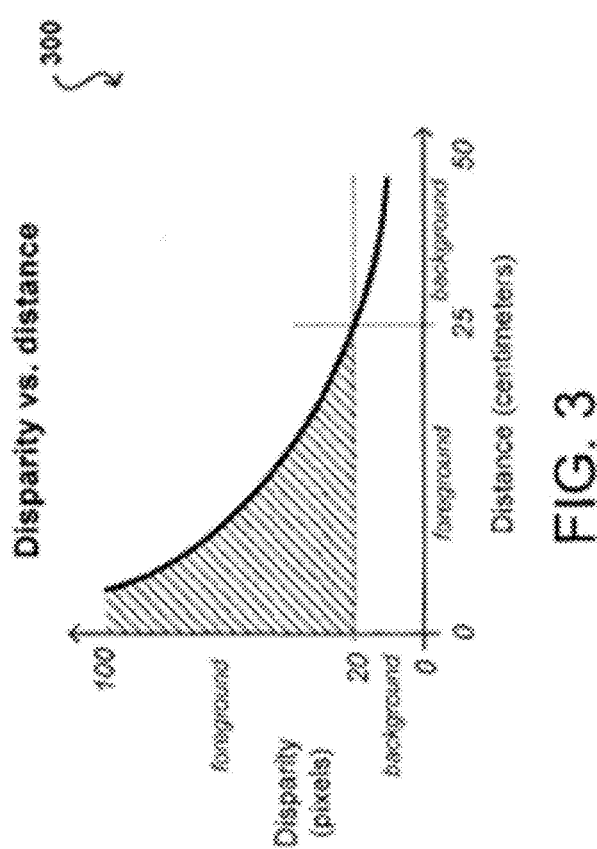
FIG. 3 illustrates an example plot showing a relationship of disparity with distance for an example stereoscopic imaging process that can be used in accordance with various embodiments.

FIG. 3 illustrates an example plot 300 showing a relationship of disparity with respect to distance. As illustrated, the amount of disparity is inversely proportional to the distance from the cameras, such that there can be significantly more disparity in the near camera field (e.g., 0 to 1.0 m) than in the far field (e.g., 1.0 m to infinity). Further, the decrease is not linear but decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 300 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, fingertips, etc.) in the stereo images, and determine the approximate distance between those feature points and the computing device. For example, the amount of disparity, D, at a given distance, d, can be represented by the relationship:

$$D = \frac{f \times B}{d}$$

where f is the focal length of each of the matched cameras and B is the baseline, or distance between the viewpoints of the cameras based at least in part upon their relative positions and separation. In this example, if the focal length of a camera is four hundred pixels and the baseline is five centimeters, for a distance of one meter the disparity would be twenty pixels. Based on relationships such as this one, the computing device may be able to determine the distance between the object of interest and the device. Various other approaches can be utilized as well as should be apparent to one of ordinary skill in the art in light of the teachings and suggestions contained herein.

In various embodiments, a user detection process is used to detect a user or a portion of a user (e.g., head, face, hands) in image data and determine an initial position and/or orientation of the user in the image data. Various approaches can be used to detect a user within the image data. Techniques for detecting a user can sometimes be characterized as either feature-based or appearance-based. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of a user, such as eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged. For example, one top-down feature-based approach is the multi-resolution rule-based method. In this embodiment, a person is detected as present within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another top-down approach, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a face.

Some feature-based and appearance-based methods use template matching to determine whether a user is represented in an image. Template matching is based on matching a pre-defined face pattern or parameterized function to locate the user within an image. Templates are typically prepared manually "offline." In template matching, correlation values for the head and facial features are obtained by comparing one or more templates to an input image, and the presence of a face is determined from the correlation values. One template-based approach for detecting a user within an image is the Yuille method, which matches a parameterized face template to face candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image. Another template-matching method is the active shape model (ASM). ASMs statistically model the shape of the deformable object (e.g., user's head, face, other user features) and are built offline with a training set of images having labeled landmarks. The shape of the deformable object can be represented by a vector of the labeled landmarks. The shape vector can be normalized and projected onto a low dimensional subspace using principal component analysis (PCA). The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on PCA, neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), the sparse network of winnows (SNoW). A variation of neural networks are deep belief networks (DBNs) which use unsupervised pre-training to generate a neural network to first learn useful features, and training the DBN further by back-propagation with trained data. Such an approach is discussed in Huang, Gary B. et al. "Learning hierarchical representations for face verification with convolutional deep belief networks." In Computer Vision and Pattern Recognition (CVPR), 2012 IEEE Conference on, pp. 2518-2525. IEEE, 2012, which is incorporated herein by reference.

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities, i.e., $$\frac{P(\text{image} | \text{object})}{P(\text{image} | \text{non-object})} > \frac{P(\text{non-object})}{P(\text{object})}.$$

In HMM-based approaches, face patterns are treated as sequences of observation vectors each comprising a strip of pixels. Each strip of pixels is treated as an observation or state of the HMM and boundaries between strips of pixels are represented by transitions between observations or states according to statistical modeling. Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. The Viola-Jones detector is discussed in Viola, Paul et al. "Rapid object detection using a boosted cascade of simple features." In Computer Vision and Pattern Recognition, 2001. CVPR 2001. Proceedings of the 2001 IEEE Computer Society Conference on, vol. 1, pp. 1-511. IEEE, 2001, which is incorporated herein by reference.

Surveys of various approaches of user detection are discussed in Yang, Ming-Hsuan et al., "Detecting faces in images: A survey." Pattern Analysis and Machine Intelligence, IEEE Transactions on 24, no. 1 (2002): 34-58 and Hjelmås, Erik et al. "Face detection: A Survey." Computer Vision and Image Understanding 83, no. 3 (2001): 236-274, which are each incorporated herein by reference.

Figure 4A:
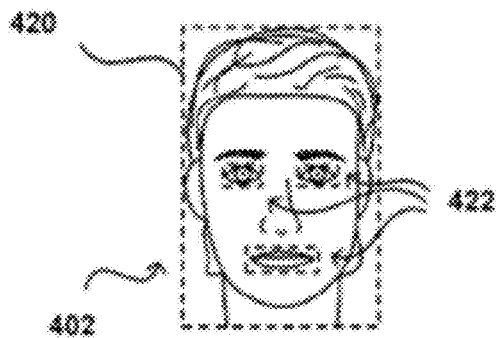
FIGS. 4A-4F illustrate examples of tracking a user in accordance various embodiments.

After at least a portion of a user has been detected in image data captured by a computing device, approaches in accordance with various embodiments track the detected portion of the user. FIGS. 4A-F illustrate certain approaches that can be utilized for detecting and tracking a user in accordance with various embodiments. FIG. 4A illustrates an example wherein the approximate position and orientation of the head of a user 402 has been determined and a virtual "box" 420 is placed around the user's head using one or more of the various user detection processes discussed herein. A similar or different approach can also be used to determine an approximate location and area 422 of each of the user's eyes (or in some cases the eyes in tandem) and mouth or other facial features. By determining the location of the user's eyes and mouth as part of facial detection, advantages may be obtained as it can be more likely that the image determined to be the user's face actually includes the user's face, and it can be determined that the user is in front of the device. Further, the relative movement of the user's eyes and mouth can be easier to detect than the overall movement of the user's face when the user is performing motions such as nodding or shaking the head back and forth.

Figure 4B:

Various other approaches can also be used to track the user. For example, FIG. 4B illustrates an example wherein various features on a user's face are identified and assigned a point 424 in the image. The system thus can detect various aspects of user facial features and can determine changes such as movement or change in shape or expression. Such an approach can provide advantages over the general approach of FIG. 4A in certain situations, as various points along a facial feature can be determined, such as the end points and at least one center point of a user's mouth. Accordingly, expressions such as a smile or frown can be captured even though the overall position of the user's mouth or face did not move.

Figure 4C:
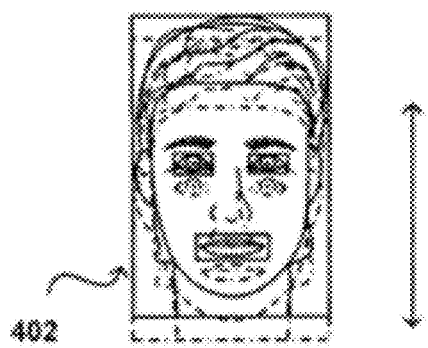
Figure 4D:
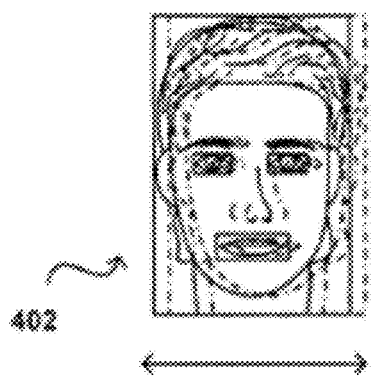
Figure 4E:
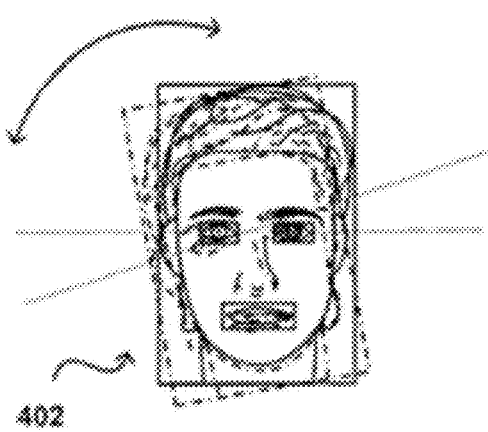

Once the facial features of a user are detected, relative motion or changes in facial expression can be tracked and utilized as input in accordance with various embodiments. For example, FIG. 4C illustrates an example where the user's head 402 is moving up and down with respect to the viewable area of the imaging element. As discussed, this could be the result of the user shaking his or her head, or the user moving the device up and down, etc. FIG. 4D illustrates a similar example wherein the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements. FIG. 4E further illustrates an example wherein the user tilts the device and/or the user's head, and the relative change in eye position is detected as a rotation. In some systems, a "line" that corresponds to the relative position of the eyes (or other facial features such as eyebrows, hairline, mouth, chin, ears, etc.) can be monitored, and a shift in angle of this line can be compared to an angle threshold to determine when the rotation should be interpreted as input.

Figure 4F:
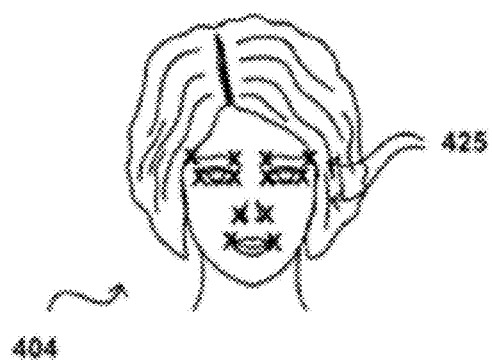

FIG. 4F illustrates another advantage of using an approach such as that described with respect to FIG. 4B to determine the position of various features on a user's face. In this example, it can be seen that the features of a head of a second user 403 have a different relative position and separation. Thus, a computing device also can not only determine positions and changes of facial features for a specific user, but can distinguish between different users. Also, the device can be configured to detect how close a user is to the device based on, for example, the amount and ratio of separation of various features, such that the device can detect movement towards, and away from, the device. This can help to improve the accuracy of facial tracking.

In some embodiments, information from other sensors of the computing device, such as information about the motion of the computing device may be used to enhance the head/face tracking, or other object tracking being performed by the device. For example, the computing device may include one or more cameras capable of capturing images of the user's head or other features (e.g., hands, fingers, facial features, etc.). The image data can be processed to perform facial recognition or gesture recognition for gestures that do not require a physical touch of the device, among other functionality. Conventionally, user detection and/or tracking can be computationally intensive and it may be desirable to optimize these processes by using the information about the motion of the computing device. For instance, if the computing device detects, based on inertial sensor data (e.g., accelerometer, gyroscope, inclinometer, and/or magnetometer), that the user has rotated the computing device such that the user's face is not likely to be within the view of the camera, the computing device may stop the process of user detection and/or tracking to conserve resources (e.g., CPU utilization, power, etc.). Similarly, if the device determines that the user is on a moving bus (e.g., as determined by a mobile payment application for bus fare) or other changing environment where the amount of light is periodically changing (e.g., as determined by an ambient light sensor), the computing device may choose to continue executing the head tracking process even though the user's face (or other features) may become undetectable during certain time intervals due to lack of light. In this manner, the computing device may utilize information about the motion of the device and other context to assist the processes for user detection and tracking.

Figure 5A:
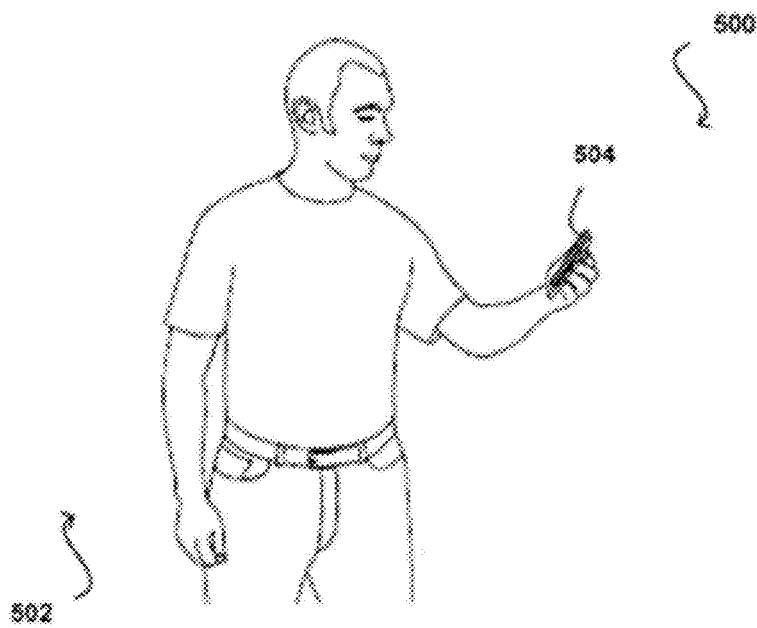
FIGS. 5A-5B illustrate example approaches for tracking a user in accordance with an embodiment.
Figure 5B:
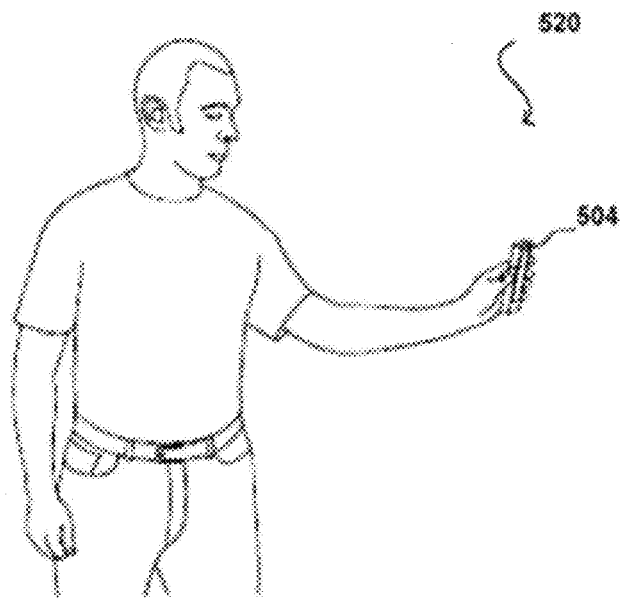

FIGS. 5A and 5B illustrate an example approach of using the motion of the computing device to supplement user detection and tracking in various embodiments. In FIG. 5A, the user 502 is holding a computing device 504, which in this example is shown to be a smartphone 504. The computing device may include one or more front-facing cameras that may capture images of the user's head, face, or other features and this image data may be analyzed for detecting and tracking a user as previously described. Because user detection and/or tracking typically can utilize a significant amount of resources, it may be useful for the computing device to leverage information about the motion of the device to enhance and supplement the user detection and/or tracking process. For example, it may be useful for the device to immediately detect (e.g., based on inertial sensor data) when the user has rotated or moved the device in such a way that the user would no longer be within the field of view of the front-facing camera(s). As shown in FIG. 5B, if the user turns the device around, the front-facing camera(s) would be facing away from the user and may have completely different objects within the field of view of the front-facing camera(s). One response to such detection may be for the computing device 504 to discontinue or suspend the user detection and/or tracking process rather than continue attempting to track the user. This may enable a more responsive user detection and/or tracking process.

Another example may be for the computing device to utilize the device motion information to continue the user detection and/or tracking process rather than discontinuing the process when the device is no longer detecting the user for short periods of time. For example, if the lighting conditions around the device are changing (e.g., when the user is on a moving train or bus), image data that can be analyzed may be captured when there is sufficient lighting and image data that cannot be analyzed may be captured when there is not enough lighting. Under such conditions, the device may analyze the motion information gathered by the sensors (e.g., accelerometer, gyroscope, light sensors, GPS receiver, etc.) and may determine that the computing device is likely located in a moving vehicle. Based on this determination, the computing device may elect to continue the user detection and/or tracking process uninterrupted (i.e., rather than repeatedly stopping and starting the process) based on the assumption that the user's face will soon once again become trackable due to the changing of the lighting conditions.

In some embodiments, user detection and tracking can be compensated, supplemented, or enhanced by motion estimation techniques that are based upon optical flow, such as block matching, differential methods, or phase correlation. Block matching is a correlation technique that searches for the best match between an image block of a current frame and a specified area of a previous frame. Differential techniques compute motion from spatial and temporal derivatives of image features such as intensities or filtered versions of the image. Differential methods include local methods and global methods. In various embodiments, local approaches based on the Lucas-Kanade optical flow algorithm can be used to determine inter-frame motion of an input video. The algorithm is set forth in Lucas, Bruce D. et al. "An iterative image registration technique with an application to stereo vision." In Proceedings of the 7th international joint conference on Artificial intelligence. 1981, and is incorporated herein by reference. The Lucas-Kanade algorithm estimates displacement of a neighborhood of pixels by analyzing changes in pixel intensity from the known intensity gradients of the image in that neighborhood. In other embodiments, a global approach, such as the Horn-Schunk algorithm or a variation thereof, can be used to determine inter-frame motion of an input video. The Horn-Schunk algorithm is set forth in Horn, Berthold K P et al. "Determining optical flow." Artificial intelligence 17, no. 1 (1981): 185-203, which is incorporated herein by reference. Horn-Schunk uses a global regularization calculation as an additional constraint.

In some embodiments, phase correlation is used to determine inter-frame motion of an input video. Phase correlation is a frequency domain technique based on the shift property of the Fourier transform for measuring motion. To determine inter-frame motion using phase correlation, the cross power spectrum (CPS) of two frames is determined. If one frame is a shifted replica of the other, i.e., f2(x,y)=f1(x+x0, y+y0) then the phase of the cross power spectrum of the two frames f1 and f2 can be defined as:

$$CPS(f_1, f_2) = \frac{F_1(\xi, \eta) \cdot F_2^*(\xi, \eta)}{|F_1(\xi, \eta) \cdot F_2^*(\xi, \eta)|} = e^{j2\pi(\xi x_0 + \eta y_0)}$$

where F is the Fourier transform of the frame f and F* is the complex conjugate. The inverse Fourier transform of the cross power spectrum is an impulse whose coordinates are located at (x0, y0), the required shift.

In various embodiments, a position and/or orientation of a user can be determined more robustly by combining results of an image-based user detection and/or tracking process with additional data, such as position estimates from one or more other image-based user detection and/or tracking processes or motion estimates from inertial sensors and/or other motion detection processes (e.g., optical flow). In at least some embodiments, a probabilistic system can be defined that models the physics of user motion, device motion, and imaging capturing by cameras of the device. The system can receive as inputs position/orientation estimates from one or more image-based detection and/or tracking processes, device motion estimates from inertial sensors or optical flow techniques, other input data, and confidence levels associated with each of these inputs. The system can be modeled to output the position and/or orientation of the user using a maximum likelihood estimation (MLE) approach. Likelihood is closely related to the more familiar concept of probability. For example, the probability p of an event x, dependent upon model parameters θ, is defined as:

$$p(x|\theta).$$

The likelihood function l for θ, on the other hand, is defined as:

$$l(\theta|X) = p(x|\theta)$$

That is, the likelihood l characterizes the parameters θ of the model given the observed data x. Maximum likelihood estimation aims to find the parameter(s) θ that make the observed data x most likely. MLE approaches can include Kalman filtering or variations thereof (e.g., extended Kalman filter, unscented Kalman filter), particle filtering, among others.

In Kalman filtering, the state of a linear system can be estimated based on a Gaussian distribution of the state. Kalman filtering comprises two steps—prediction and correction. The prediction step uses the state model to predict the new state of the parameters of the model:

$$\overline{X}^t = \vec{D}X^{t-1} + W,$$

$$\overline{\Sigma}^t = \vec{D}\Sigma^{t-1}\vec{D}^T + Q^t,$$

where $\overline{X}^t$ is the state prediction at time t, $$\overline{\Sigma}^t$$

is the covariance prediction at time t, $\vec{D}$ is the state transition matrix correlating the relationship between the state parameters at time t and t−1, Q is covariance of the noise W. In the correction step, the current measurement Zt is used to update the object's state:

$$K^t = \Sigma^t \overline{M}^T \left[ \overline{M} \Sigma^t \overline{M}^T + R^t \right]^{-1},$$

$$X^t = \overline{X}^t + K^t \underbrace{\left[ R^t - \overline{M} \overline{X}^t \right]}_{v},$$

$$\Sigma^t = \Sigma^t - K^t \overline{M} \Sigma^t,$$

where v is referred to as the innovation, $\vec{M}$ is the measurement matrix, K is the Kalman gain (also referred to as the Riccati equation) used for propagation of the state model. When the system is nonlinear, a Taylor series expansion can be used to extend the Kalman filter.

When using a Kalman filter for tracking a user, the state of the Kalman filter may represent, for example, one or more of a position of the user relative to the device, a velocity or acceleration of the user with respect to the device, a position of the device, and motion of the device. The measurements used by the Kalman filter may include, for example, a location of the user as determined from camera images and measurements from inertial or other sensors of the device. For each new set of measurements obtained by the device the Kalman filter may be updated to obtain a new estimate of the location of the user relative to the device.

In particle filtering, the state of the object is modeled as a sampling probability instead of as a Gaussian distribution. Particle filtering models the conditional state density P(Xt|Zt) at time t as a set of samples or particles $\{s_t^n: n=1, \ldots, N\}$ with sampling probability or weights $\pi_t^n$. The weights are used to characterize the importance of a particular sample or particle. A common sampling technique is importance sampling, which includes selection of N random samples $\hat{s}_t^n$ from $\vec{S}_{t-1}$ by generating a random number r between 0 and 1 and finding the smallest j such that $c_{t-1}^{j-1} > r$ and setting $\hat{s}_t^n = \hat{s}_{t-1}^j$. In the prediction step, for each selected $\hat{s}_t^n$, a new sample is generated by:

$$s_t^n = f(\hat{s}_t^n, \vec{W}_t^n),$$

where $\vec{w}_t^n$ is a zero mean gaussian error and f is a non-negative function, i.e., f(s)=s. In the correction step, weights $\pi_t^n$ corresponding to the new samples $s_t^n$ are calculated using the measurements zt by:

$$\pi_t^n = p(z_t | x_t = s_t^n),$$

where p can be modeled as a Gaussian density. Using the new samples $\vec{S}_t$, the new position of the object can be estimated using:

$$\epsilon_t = \Sigma_{n=1}^N \pi_t^n f(s_t^n, \vec{W}).$$

When using a particle filter for tracking a user, the states and measurements may be the same as when using a Kalman filter. For each new set of measurements obtained at the device the particle filter may be used, as described above, to obtain a new estimate of the location of the user relative to the device.

Figure 6A:
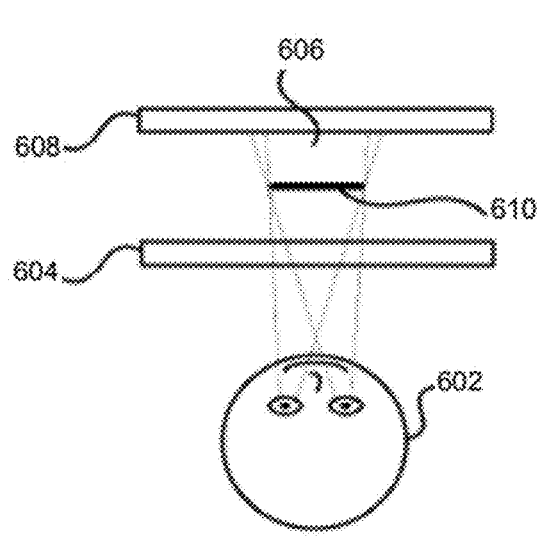
FIGS. 6A-6D illustrate example approaches to determining changes in the relative viewing angle for a user in accordance with various embodiments.
Figure 6B:
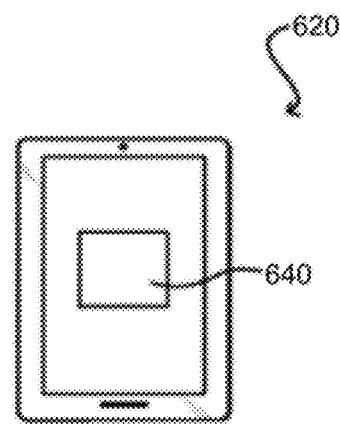
Figure 6C:
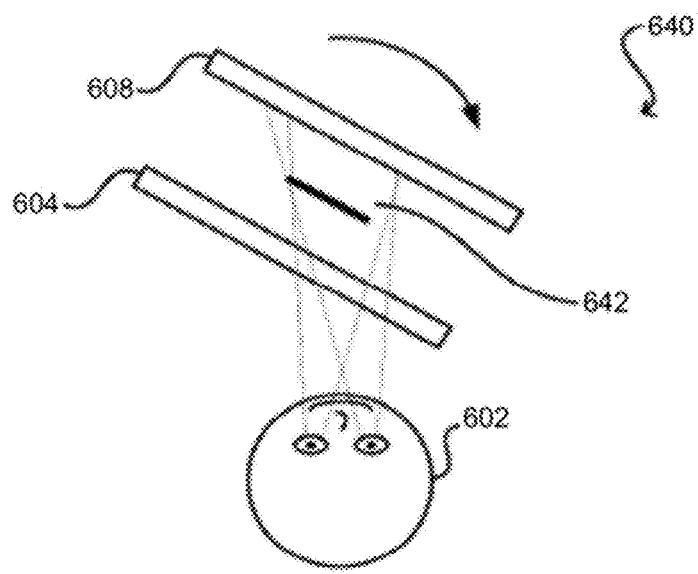
Figure 6D:
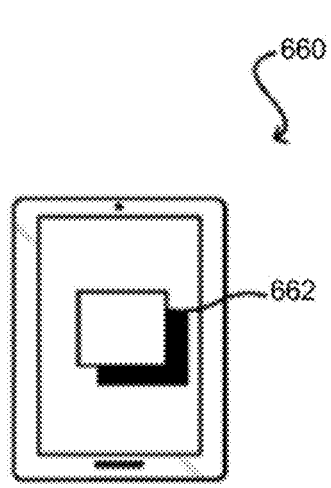

FIGS. 6A to 6D illustrate an example of how an interface plane or element at different depths can be used to generate viewing-angle appropriate images in accordance with at least some embodiments. In FIG. 6A, the example orientation 600 has a user 602 substantially in front of a display element 604 of a device. For simplicity of explanation, the interface plane or element here is represented in three dimensions, with a box 606 on a background 608. At the current viewing angle, the user is only able to see the top surface 610 of the interface plane or element 606, as illustrated in the display view 620 of FIG. 6B. In the orientation 640 of FIG. 6C, the device has been rotated (or the user has moved with respect to the device). To provide an appropriate user experience in at least some embodiments, the interface plane or element is effectively rotated with the device, such that the interface plane or element and background 608 would rotate accordingly. Based on the current viewing direction of the user 602, it can be seen in the display view 660 of FIG. 6D that the viewable portion 662 of the interface plane or element includes not only the top of the interface plane or element but at a level of depth (i.e., the interface plane appears to be closer to a display screen of the device). By calculating this angle, the application can determine the portions of the top and side of the interface plane or element to display as a result of the rotation. It also can be seen in FIG. 6C that any area occluded by the right side of the interface plane or element in FIG. 6A now can be seen, and that the area occluded by the left side of the box is interface plane or element greater in FIG. 6C.

Figure 7A:
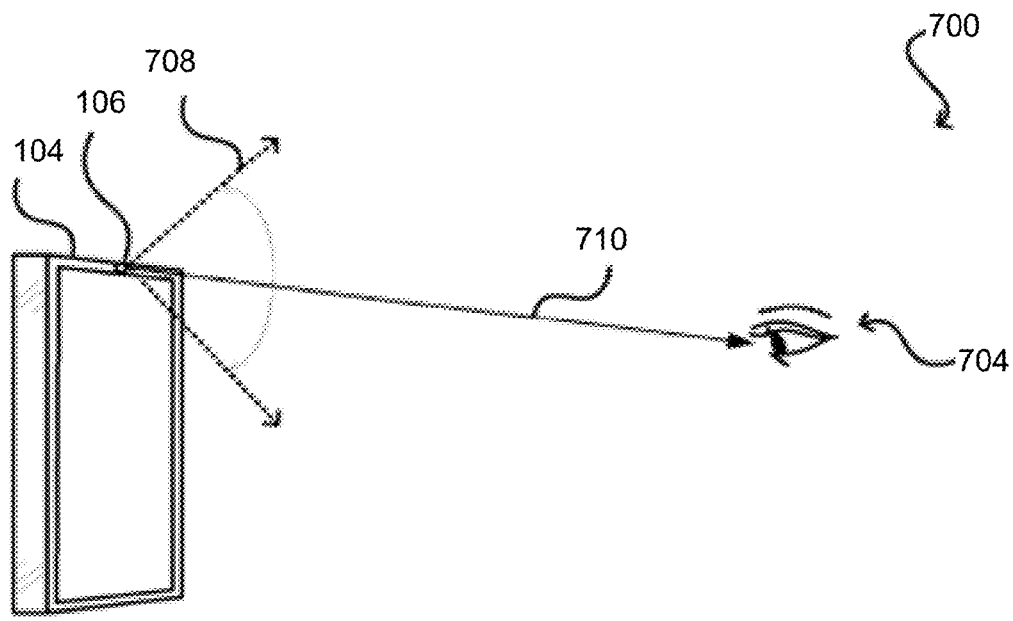
FIGS. 7A-7B illustrate an example approach to determining the relative position of a user that can be utilized in accordance with various embodiments.

In at least some embodiments, a computing device can utilize one or more cameras or other such sensors to determine the relative direction of the user. For example, FIG. 7A illustrates an example situation 700 wherein a computing device 104 is configured to utilize at least one camera element 106 to attempt to locate a feature of a user, such as the user's head or eyes, for purposes of point of view determination. In this example, the user's eyes 704 are located within the field of view 708 of a camera of the computing device 104. As discussed elsewhere herein, however, the point of view of a user can be determined using positions of the user's eyes, pupils, head, or other such features that can be indicative of at least a general point of view. In some embodiments, the device might look for an object held by or otherwise associated with a user to determine a general point of view for rendering. Further, in some embodiments a device might utilize at least two different cameras positioned on the device with a sufficient separation such that the device can utilize stereoscopic imaging (or anther such approach) to determine a relative position of one or more features, with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 710 of at least one of the user's eyes with respect to the camera. In many embodiments, direction information will be sufficient to provide adequate point-of-view dependent rendering. In at least some embodiments, however, it can also be desirable to determine distance to the user in order to provide a more consistent and accurate rendering. In some embodiments, methods such as ultrasonic detection, feature size analysis, luminance analysis through active illumination, or other such distance measurement approaches can be used to assist with position determination. In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature as known for disparity mapping and other such processes.

Figure 7B:
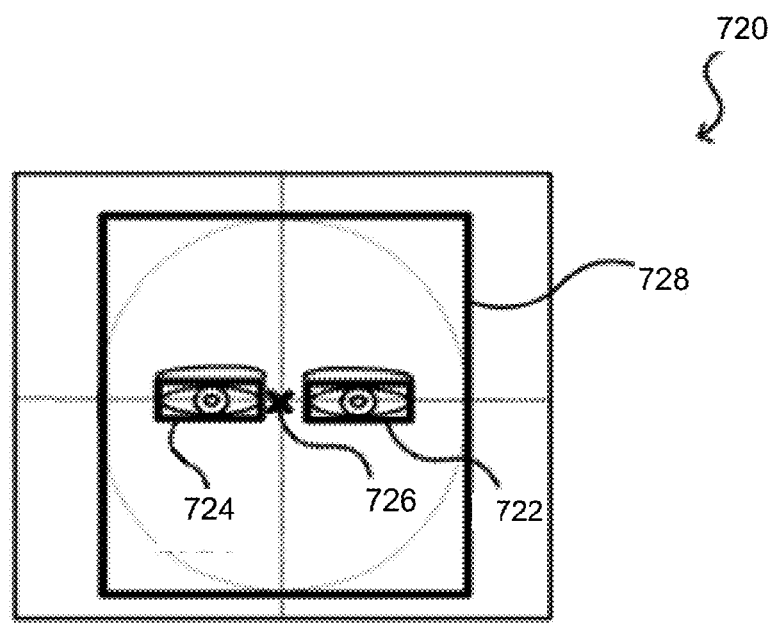

Further illustrating such an example approach, FIG. 7B illustrates an example image 720 that could be captured of the user's head and eyes using the camera 106 of FIG. 7A. One or more image analysis algorithms can be used to analyze the image to perform pattern recognition, shape recognition, or another such process to identify a feature of interest, such as the user's eyes. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. As illustrated in this example, both eyes of the user might be able to be located in the captured image information. At least some algorithms are able to determine an approximate location or region 722, 724 for each eye, or at least an approximate location 728 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 726 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user, with that relative direction being used for the point of view to use in rendering the interface.

When using a camera to track location, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. In some embodiments, a sensor or other such element (or combination thereof) of a computing device can be used to determine motion and/or orientation of the computing device, which can help adjust point of view determinations. The sensors may be any appropriate motion sensor(s) capable of providing information about rotations and/or translations of the device, as may include accelerometers, inertial sensors, electronic gyroscopes, electronic compasses, magnetometers, and the like. The device can be configured to monitor for a change in position and/or orientation of the device using these motion sensor(s).

Upon detecting a change in position and/orientation of the device exceeding a specified threshold, the UI elements presented on the device can be redrawn or rendered to correspond to the new position and/or orientation of the device to simulate 3D depth. In other embodiments, input data captured by the motion and/or orientation determination components can be analyzed in combination with images captured by one or more cameras of the device to determine the user's position with respect to the device or related information, such as the user's viewing angle with respect to the device. Such an approach may be more efficient and/or accurate than using methods based on either image analysis or motion/orientation sensors alone.

Figure 8:
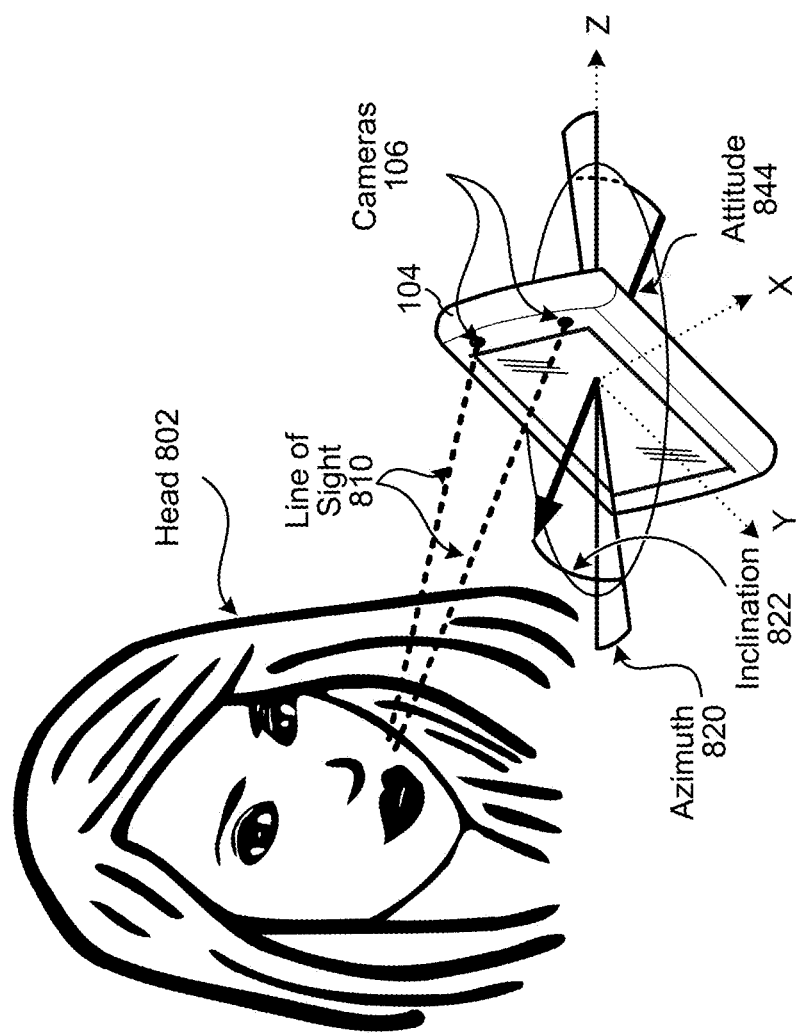
FIG. 8 illustrates using motion sensors with image processing to compute motion of a device in accordance with various embodiments.

FIG. 8 illustrates that while camera(s) 106 may be used to determine orientation of the device 104 relative to a face/head 802 of a user, while motion sensors may also be used to detect orientation/motion of the device 104. When a position of the user's head is established, certain changes to the head position may be detected using the motion sensors of the device, which provide output with lower latency that that of a camera-based head tracking system described above. The motion sensors of the device 104 may be used to track changes in device motion relative to an XYZ coordinate system (such as that illustrated in FIG. 8), relative to an angular position, such as an orientation measured in azimuth 820, inclination 822, or attitude, 824, or relative to some other measurement system. With a priori knowledge of the head position (as calculated by a camera based head tracking system or, as noted below, using a sensor based tacking system) before a specific device motion, the device 104 may measure a change in orientation/position as measured by motion sensor(s) to compute an expected post-motion head position. The UI may then be rendered based on this expected post-motion head position.

Figure 9A:
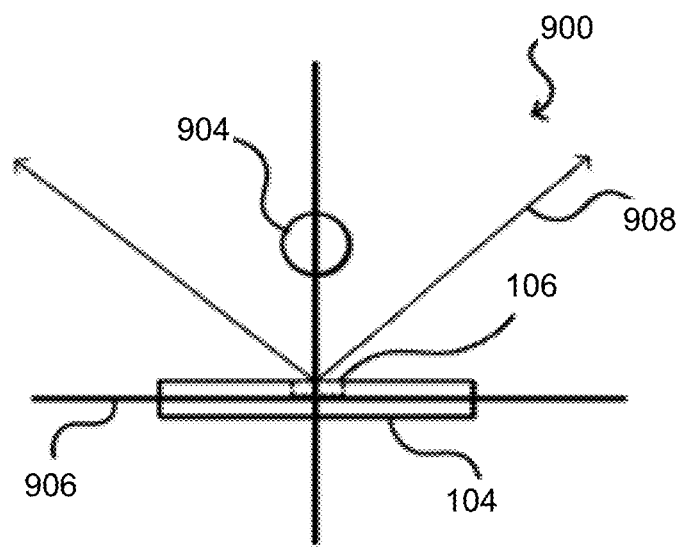
FIGS. 9A-9B illustrate an example approach to determining device motion that can be utilized in accordance with various embodiments.

For example, FIG. 9A illustrates a "top view" 900 of a computing device 104 operable to capture an image of an object 904 (e.g., a user's head) within an angular view 908 of a camera 106 of the computing device. In this example, the computing device 104 includes at least one orientation- or rotation-determining element, such as an electronic compass or electronic gyroscope, that is able to determine a frame of reference 906 in two or three dimensions with respect to a first orientation of the device. In at least some embodiments, an electronic compass might be used to determine an axis of the frame of reference 906, as may correspond to a North direction, etc. In other embodiments, a component such as an electronic gyroscope might be calibrated periodically with a component such as a compass, but might instead determine changes in orientation about three axes of rotation over time. Various other approaches to determining changes in orientation about one, two, or three axes of rotation can be used as well within the scope of the various embodiments.

A first frame of reference 906 or orientation can be determined at or near the time of capture of a first image by a camera 106 of the computing device 104. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 9B:
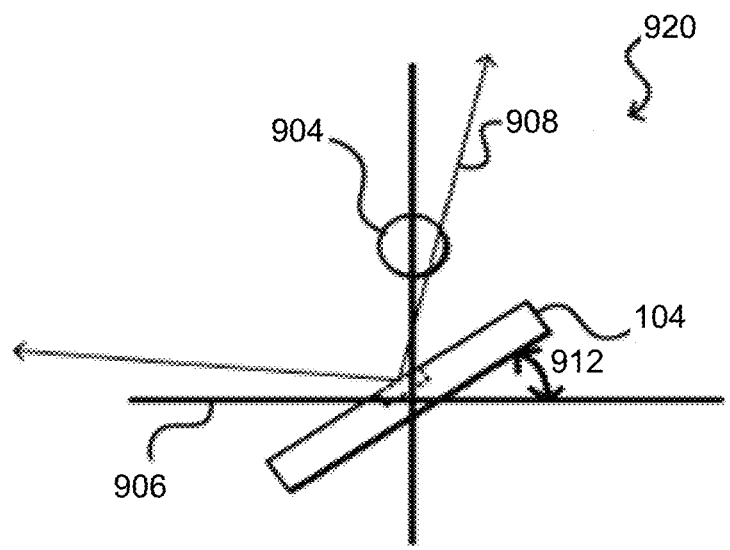

FIG. 9B illustrates a second top view 920 after a change in orientation of the computing device 104. The electronic gyroscope (or other such component or embedded sensor) can detect the change in orientation, in this example corresponding to a change in angle 912 with respect to the frame of reference in the plane of the figure. The gyroscope can present information about the change in orientation in any appropriate form, such as in angles or radians of change for one, two, or three degrees (e.g., Δx, Δy, Δz), percentage changes in pitch, roll, and yaw, etc. In this example, the change in orientation is determined to be a given angular amount of rotation 912 about a single axis. As illustrated, this causes the object 904 to be moved to the right edge of the field of view 908 of the camera 106. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

As described above in reference to FIG. 1A, it may be desirable to perform some form of head tracking using sensor data for situations where camera based head tracking is inoperable (such as if the cameras or blocked, a device is in a low-power state, etc.) or unavailable (such as for a device without a camera based head tracking system). Such sensor based head tracking may output a head location (which may be represented in a variety of ways/coordinate systems) in a similar manner to the camera based head tracking described above. The head location may then be used by an operating system, UI, or other application/component to operate on the output head location, regardless of how the head location was generated.

Figure 10A:
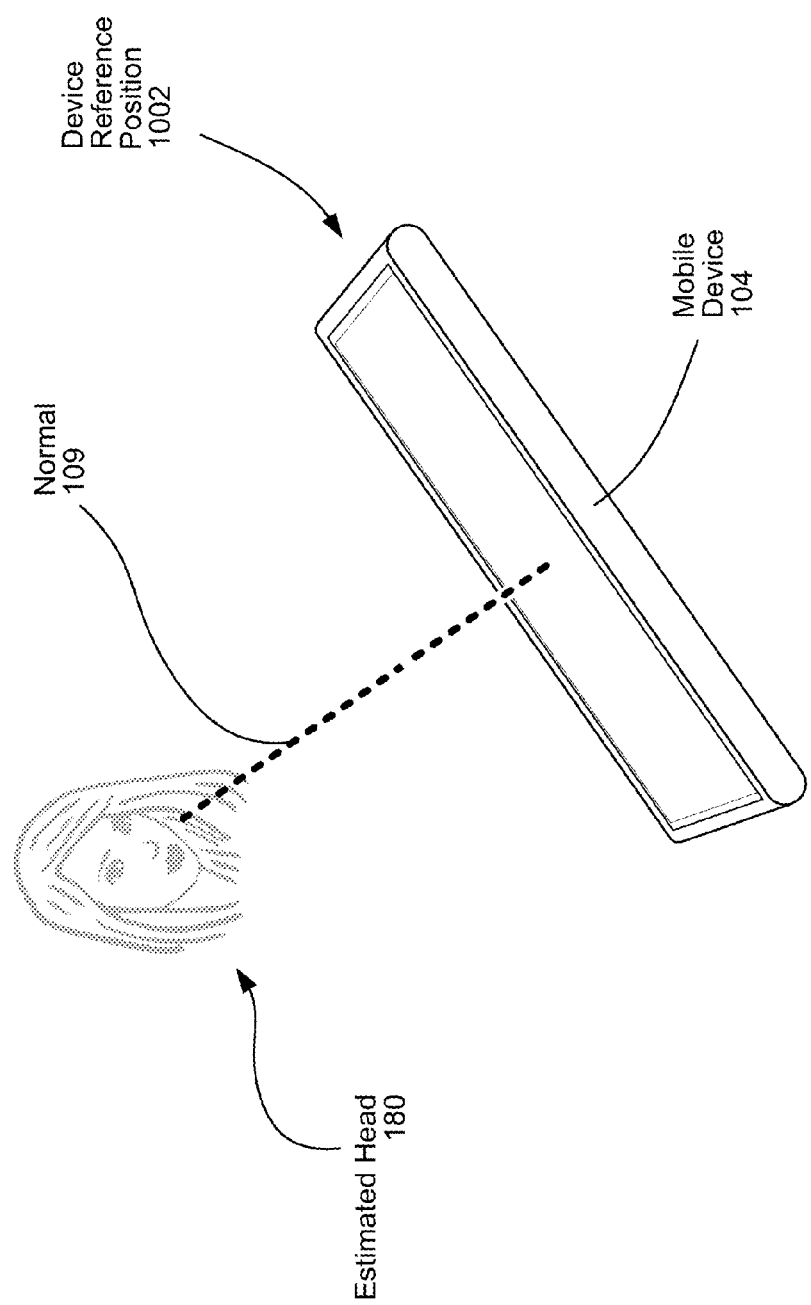
FIGS. 10A-10C illustrate estimating a location of a user's head in accordance with various embodiments.

As shown in FIG. 10A, a mobile device 104 may determine a device reference position 1002. The device reference position 1002 may be determined by taking the output from one or more sensors of the device 104 (such as a gyroscope, position sensor, etc. as detailed below) at a first time. That output may be saved and set to indicate the device reference position 1002. Movement of the device (indicated by later output from the sensor(s)) may be measured from the device reference position. The device may then determine a location of an estimated head 180, relative to the device reference position 1002.

Figure 10B:
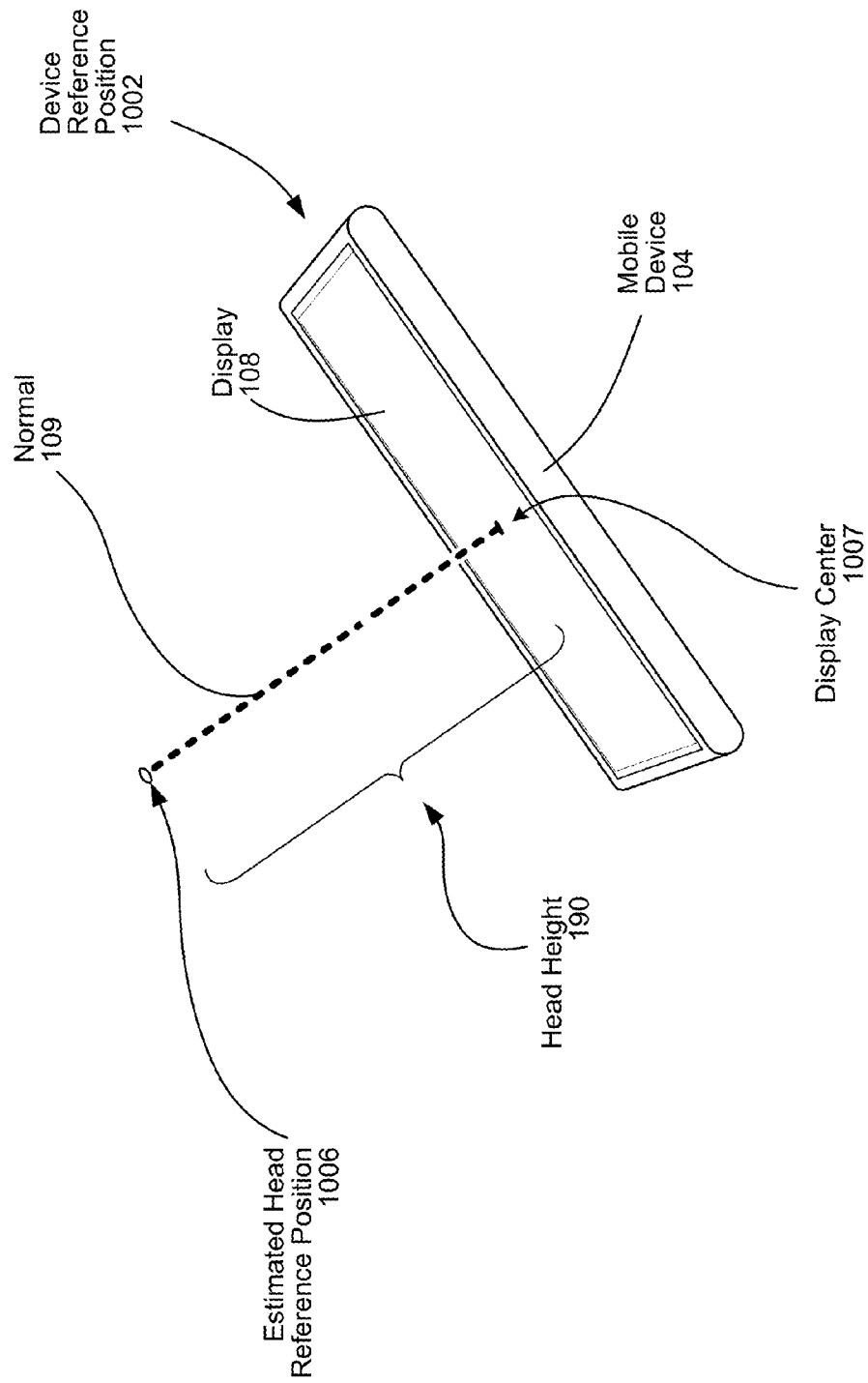

As shown in FIG. 10B, the device may determine an estimated head reference position 1006. This position 1006 may be used, at least initially, as the output head location. The estimated head reference position 1002 may be located along the normal 109, which is perpendicular to the display 108 and extends from the display center 1007 though the estimated head reference position 1006. The display center 1007 is a center of the display 108 of the device 104. For present purposes, the display center 1007 may be said to be at coordinates X=0, Y=0, and Z=0, though those precise values are configurable. The estimated head reference position 1002 is located at a fixed height above the display center 1007. That fixed height is illustrated in FIG. 10B as the head height 190. The head height may be any value, but for present illustration may be a value between 300 mm-400 mm, a typical distance at which a user may hold a device. Thus, the coordinates of the estimated head reference position 1006 may be said to be X=0, Y=0 and Z=head height.

The initial estimated head reference position 1006 may be determined as noted above, by using the device reference position 1002. In another embodiment, however, the device 104 may use a previously calculated head position as the estimated head reference position 1006. For example, a camera based head tracking system (or other system) may have been providing a position for the head, but may shut down, or otherwise be unable to continue tracking the head. In such an instance, the last head position calculated by the camera based system may be adopted as the estimated head reference position 1006.

Figure 10C:
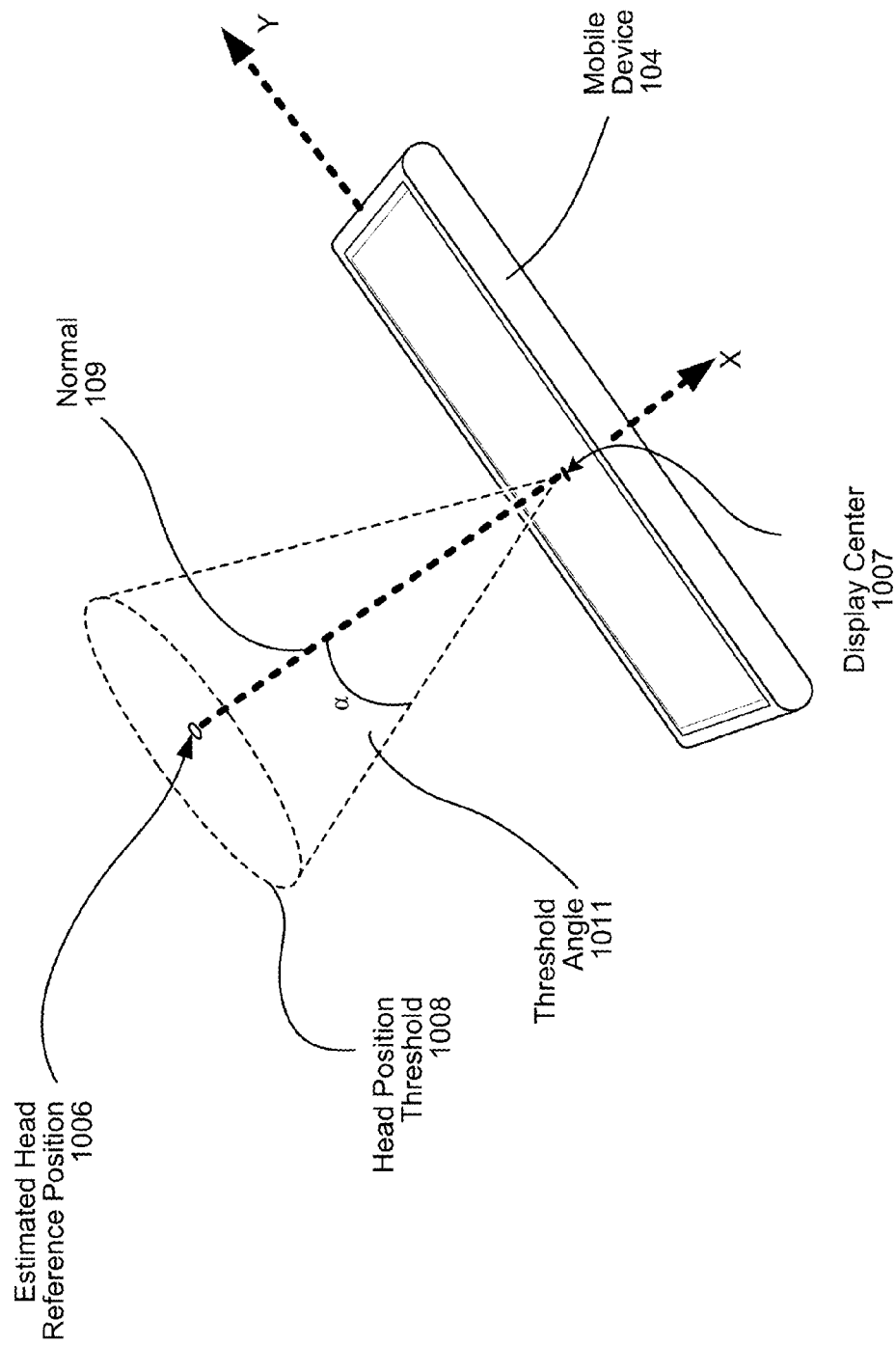

As the device 104 detects movement (described below), the head position will move from the estimated head reference position 1006 to a current head position based on the movement. To ensure the head does not travel too far, the device may also configure a head position threshold. As the estimated head tracking system may be imperfect due to various factors (incorrect assumptions, accumulated error in sensor data, etc.), the device 104 configures the threshold to avoid the estimated head position traveling too far. As shown in FIG. 10C, the head position threshold 1008 may initially be illustrated as a border surrounding the estimated head reference position 1006, though the head position threshold remains fixed relative to the normal 109, as illustrated in later figures. If a current head position crosses the border of the head position threshold 1008, the device 104 may take corrective action (as described below in reference to FIGS. 14-18).

As shown in FIG. 11, the head position threshold 1008 may be generally shaped to coincide with the shape of the device 104. Axes 1102 correspond to the device axes shown, for example, in FIGS. 1B and 10C. Thus the head position threshold 1008 is illustrated as an oval with the larger length along the Y axis, as the illustrated device 104 is longer along the Y axis than the X axis. Further, although illustrated as a two-dimensional oval, the head position threshold 1008 may more properly be considered as a domed shape in three dimensions as the head position is assumed to remain at a fixed distance (equal to the head height 190) from the display center 1007 as the device moves. As shown by FIG. 10C, the head position threshold may also be defined by a cone shape where the walls of the cone are each a threshold angle 1011 (α) away from the normal 109. Thus, if the vector 112 between the head position and the display center 1007 is detected to be greater than the threshold angle 1011 (α) away from the normal 109, the head may be considered to have passed the head position threshold 1008. The head position threshold may also be configured as a certain distance, for example from the estimated head reference position 1006, such that if the head moves beyond that certain distance, the head is considered to move beyond the head position threshold 1008. Thus the certain distance may define a radius from the estimated head reference position 1006, and if the head moves past that radius, it is considered to have crossed the head position threshold 1008. If the threshold is configured as a distance, the head position threshold 1008 shown in FIG. 11 would be illustrated as a circle (or as a dome shape if done in three dimensions).

After the device 104 determines the device reference position 1002, it monitors the output from its motion sensors. Using that output, the device may determine a new current position, which is defined as the movement from the device reference position 1002 detected by the motion sensors. The device 104 may assume that the head has not moved from the estimated head reference position in actual space, though the head will move relative to the device as the device moves. For present purposes, only rotation of the device around the device center 1007 (i.e., around the X, Y, or Z axes) is considered for purposes of determining the head position, as the head is assumed to always be at the head height away from the device center 1007. Non-rotational movement of the device in space may be discounted.

Figure 12A:
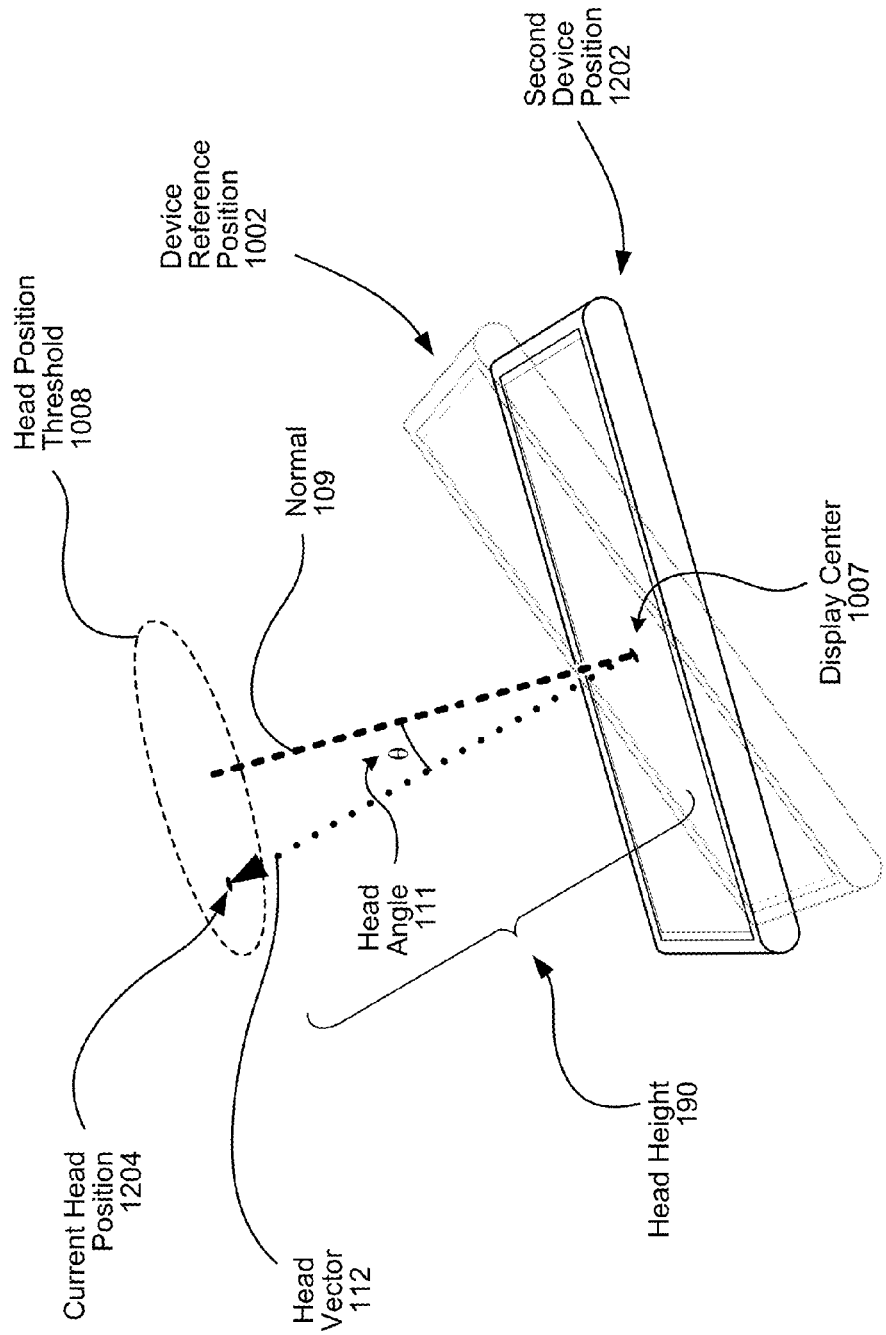
FIG. 12A illustrates determining a new estimated head position according to various embodiments.

As the device 104 calculates its new position, it may estimate a new head position based on the new device position. An example of this is shown in FIG. 12A. As illustrated, the device 104 may move from a device reference position 1002 to a second device position 1202. The device 104 may detect movement to the second device position 1202 using the motion sensors of the device 104. The device-based references, such as the normal 109 and the head position threshold 1008 move with the device 104. The head position (which as noted above does not change with regard to virtual space) does change relative to the device. Using the second device position 1202, the display center 1007, and/or the head height 190, the device may determine the head vector 112 and the current head position 1204. As can be seen, the head vector 112 is a vector having a length/magnitude of the head height from the display center 1007 to the current head position 1204. The angle between the head vector 112 and the normal 109 is the head angle 111 (θ). As can be seen in FIG. 12A, the current head position 1204 is within the head position threshold 1008. This can also be seen in FIG. 12B, which shows the current head position 1204 relative to the head position threshold 1008.

Figure 13A:
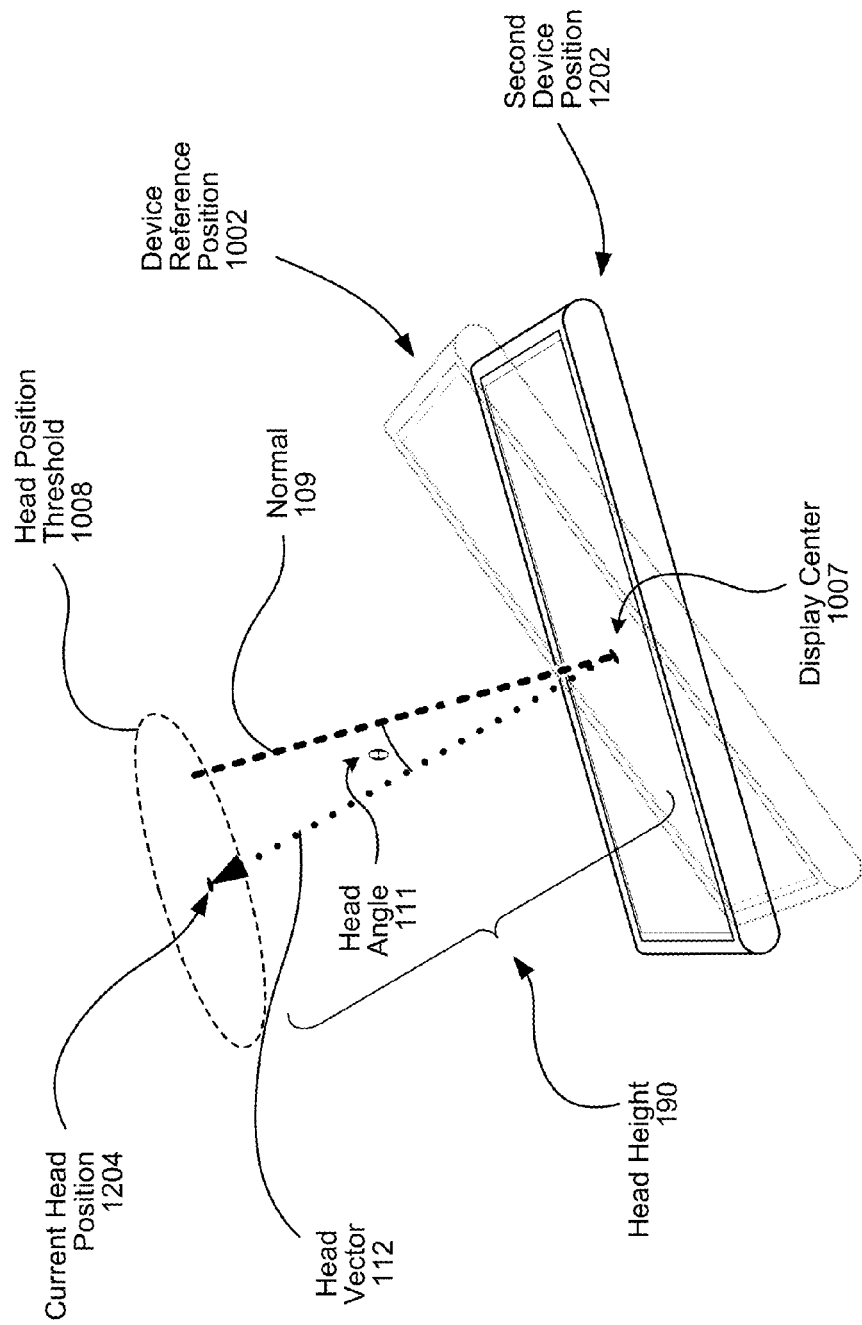
FIG. 13A illustrates determining a new estimated head position according to various embodiments.

In another embodiment, the head position threshold may remain fixed relative to the estimated head reference position 1006 established when the device is in the device reference position 1002, as illustrated in FIGS. 10B and 10C. Thus, when the device moves, the position of the normal in the second device position may be compared to the threshold to determine if the device movement has caused the head position to move significantly relative to the device. This is illustrated in FIG. 13A. As shown in FIG. 13A, the head position threshold 1008 is centered on the current head position 1204. As the device 104 detects movement to the second device position 1202, the normal 109 may move relative to the head position threshold 1008. The device may then determine, for example using head angle 111 (θ) whether the normal has exceeded the head position threshold. As can be seen in FIG. 13A, the normal 109 is within the head position threshold 1008. This can also be seen in FIG. 13B, which shows the normal 109 relative to the head position threshold 1008.

As can be appreciated, the device can accumulate sensor data to continue to track its position change relative to the device reference position 1002, and thus continue to recalculate the new current head position based on the movement change from the device reference position 1002 to a position at a current time. For example, a gyroscope may output a particular rotation during a time frame. The device 104 may accumulate that rotation output over time to track the device's rotation from the device reference position 1002. Such accumulation of sensor data is known in the art.

Figure 12B:
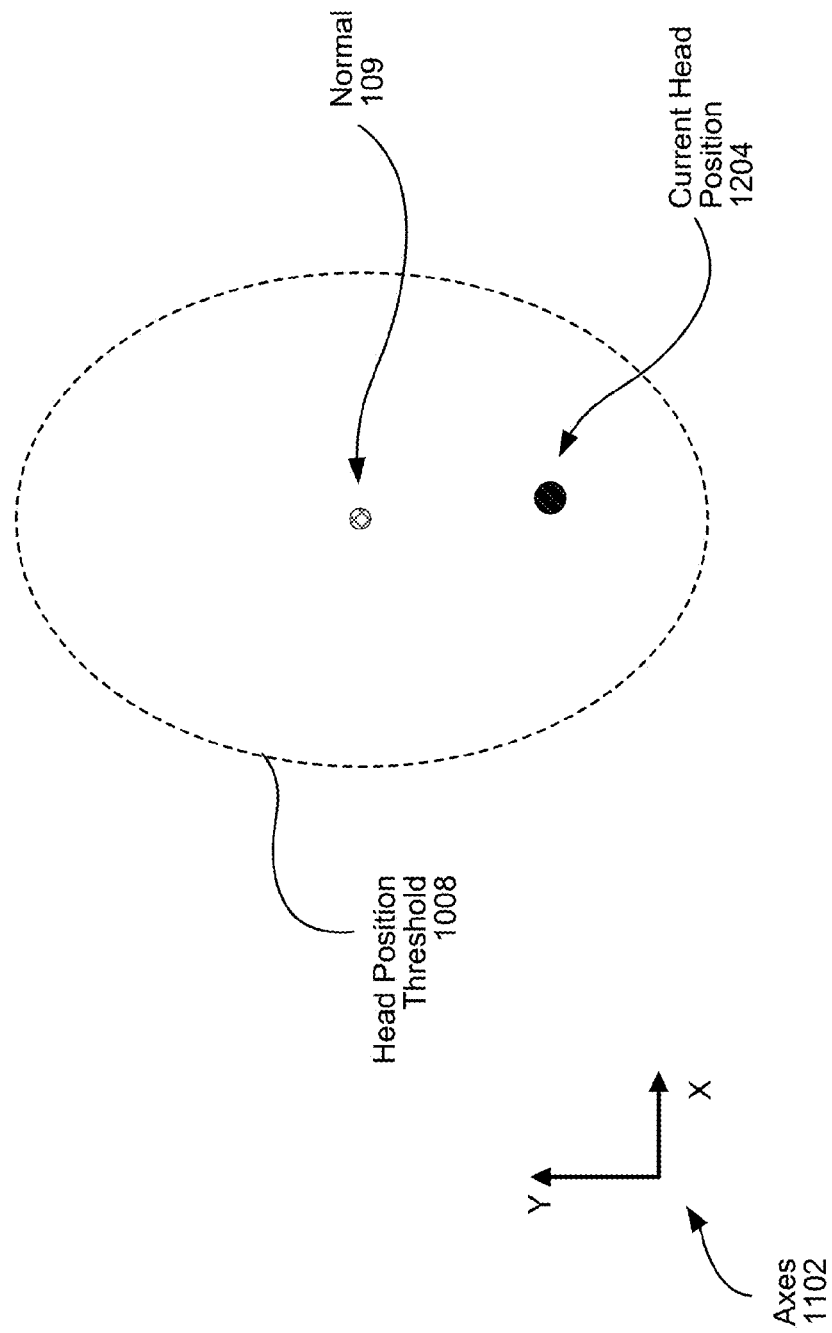
FIG. 12B illustrates a current head position relative to a head position threshold according to various embodiments.
Figure 13B:
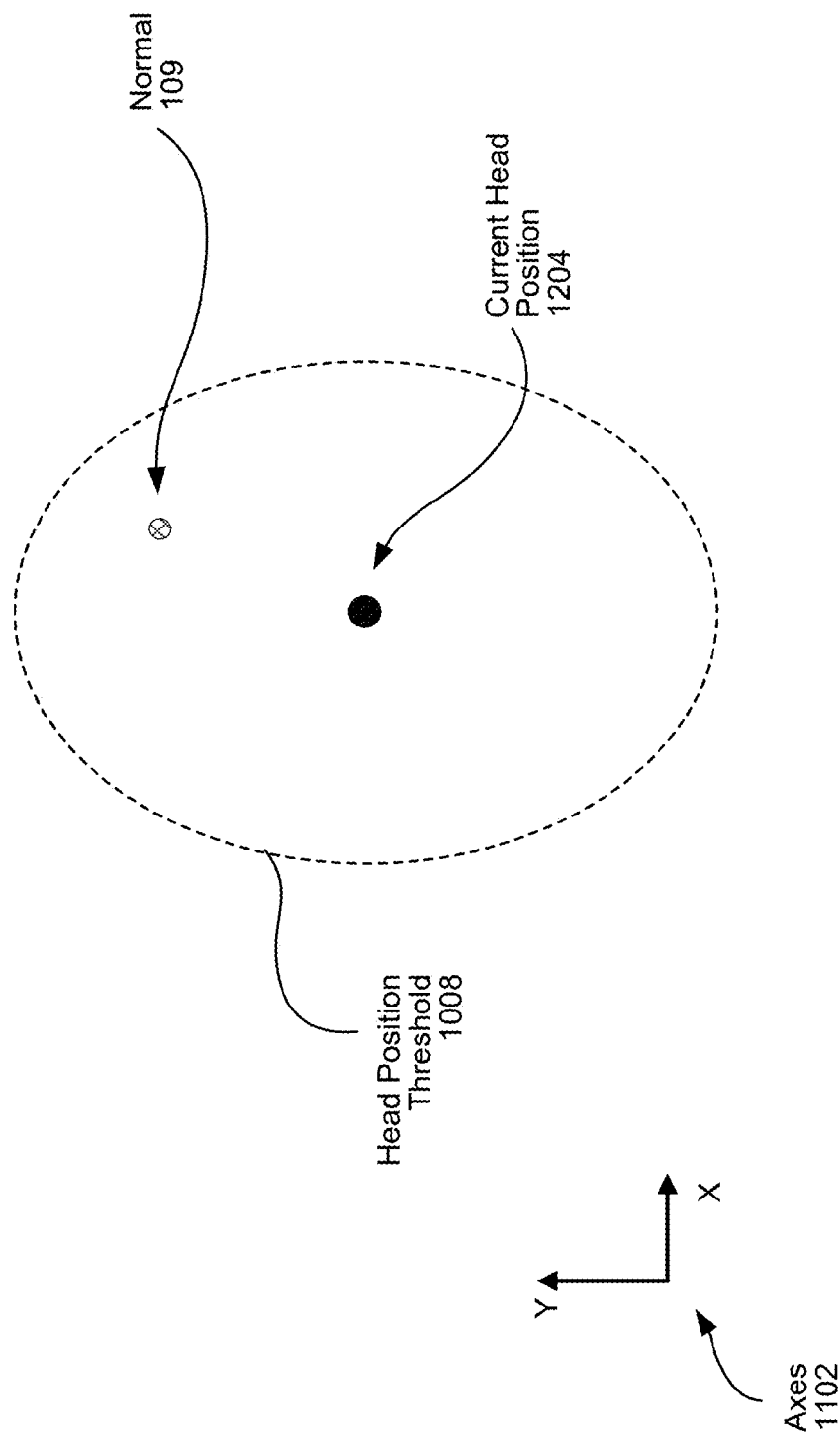
FIG. 13B illustrates a current head position relative to a head position threshold according to various embodiments.
Figure 14:
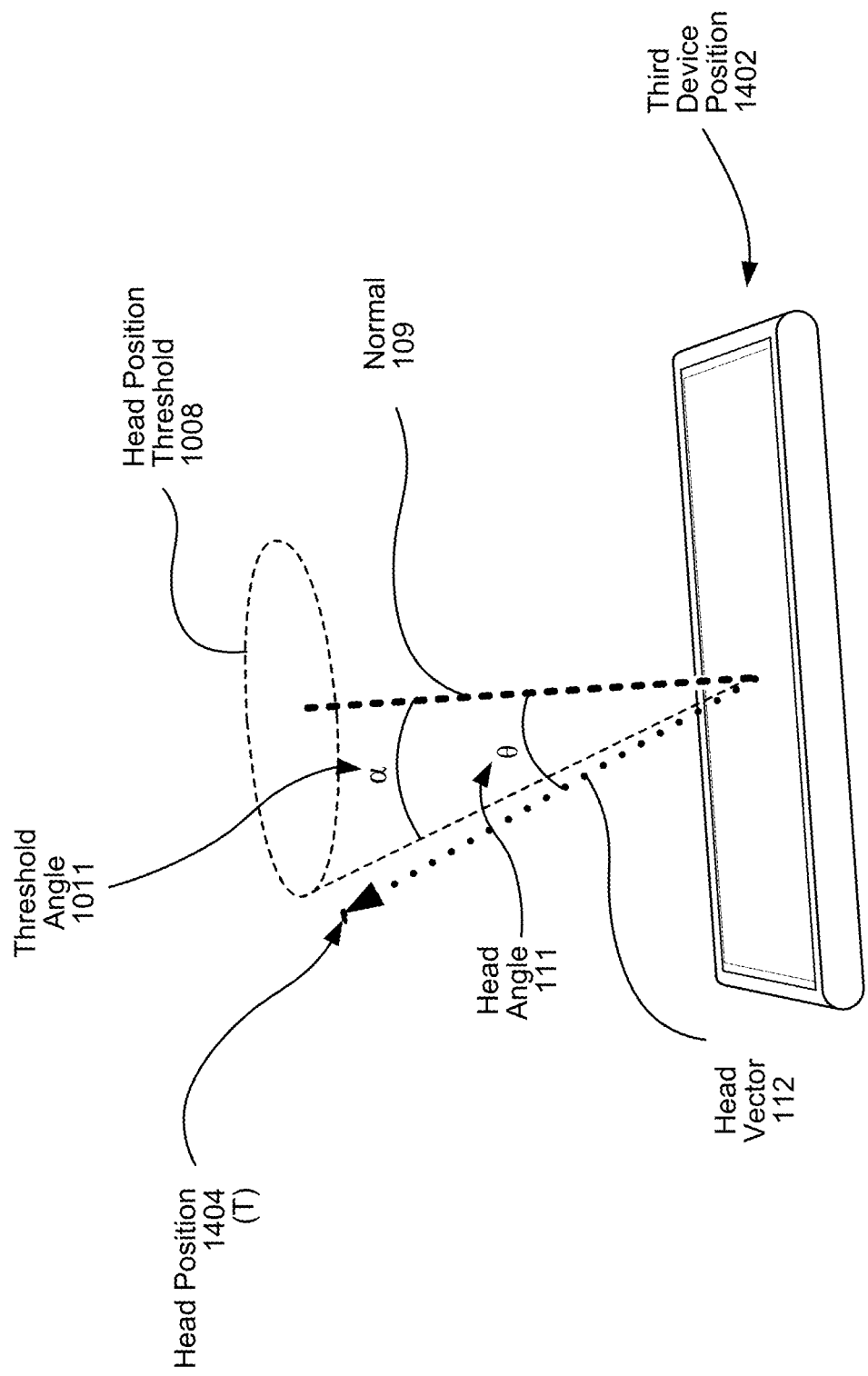
FIG. 14 illustrates a current head position relative to a head position threshold according to various embodiments.
Figure 15:
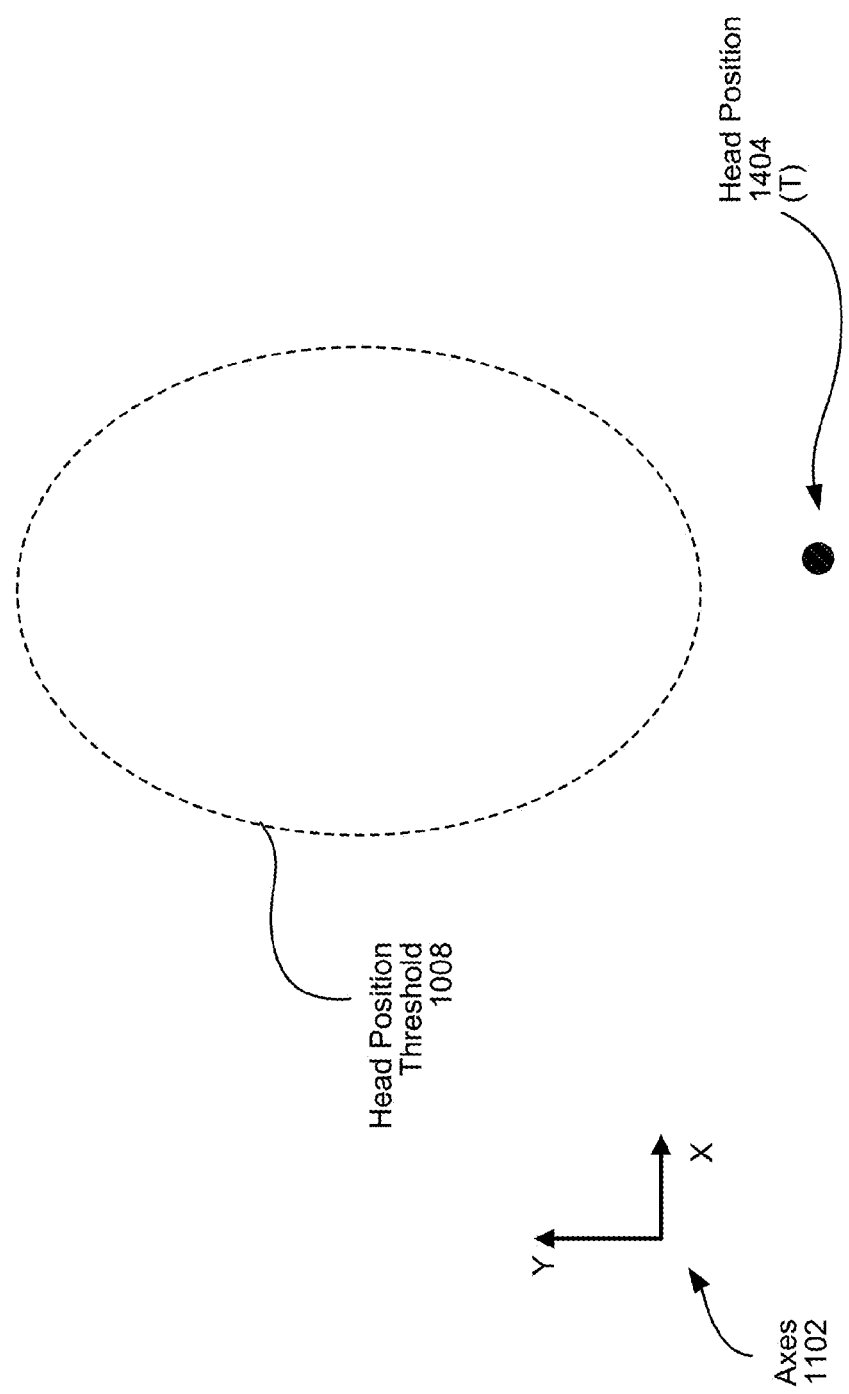
FIG. 15 illustrates a current head position relative to a head position threshold according to various embodiments.

As noted above, to counteract head position drift, which may be cause by sensor error accumulation, or other error factors, the head position threshold 1008 may be used to determine if a head position has moved too far and should be corrected. A head position outside the head position threshold 1008 is illustrated in FIG. 14. FIGS. 14-19 illustrate head correction where the head position threshold 1008 moves with the device normal 109 (as illustrated in FIGS. 12A and 12B) and correction is based on movement of the head position relative to the head position 1008 or head reset threshold 1602 (discussed below relative to FIG. 16). The teachings of head position correction illustrated and discussed below, however, are equally applicable where the head position threshold 1008 stays fixed with the head position (as illustrated in FIGS. 13A and 13B) and correction is based on movement of the device normal 109 relative to the head position threshold 1008 or head reset threshold 1602. As shown in FIG. 14, a device may detect movement to a third device position 1402. In that position, the device may determine that the current head position 1404 at time T is as illustrated in FIG. 14. As shown, the head position 1404 at time T is outside the head position threshold 1008. Further, the head angle 111(θ) between the normal 109 and the head vector 112 is greater than the threshold angle 1011 (α). FIG. 15 shows the head position 1404 being outside the head position threshold 1008. The device 104 may now take action to correct the head position.

Figure 16:
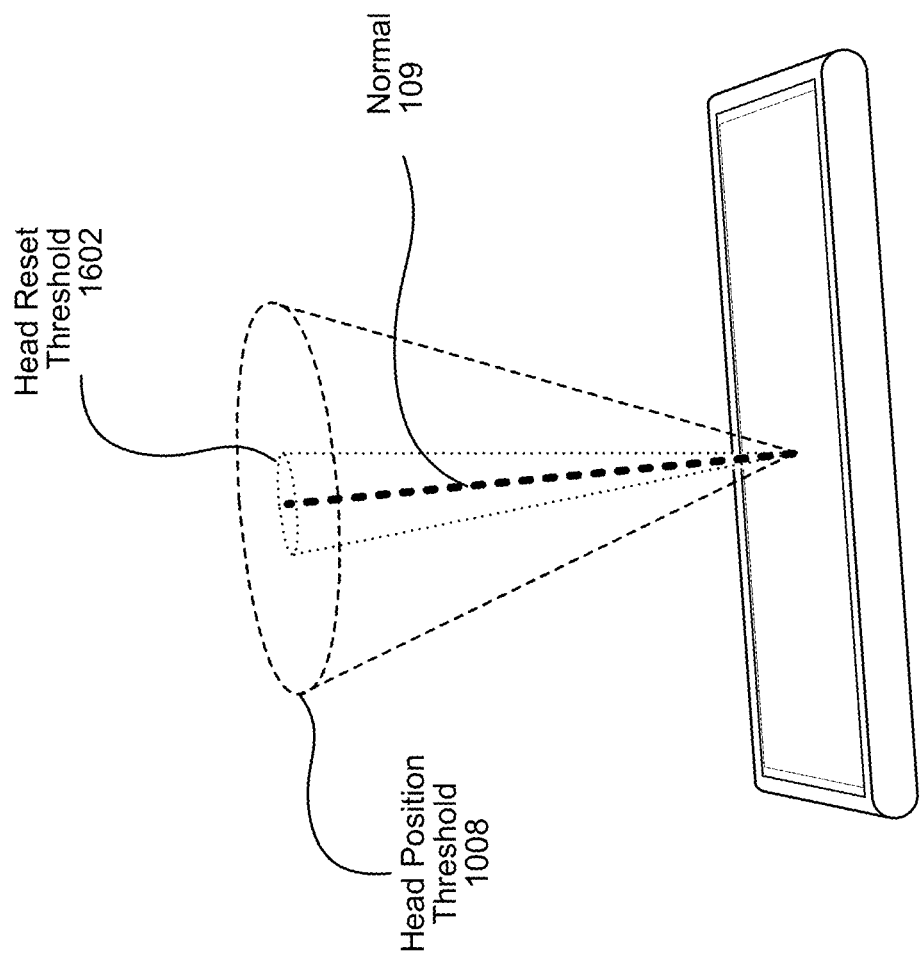
FIG. 16 illustrates a head reset threshold according to various embodiments.

To correct the position of the head, the device may gradually revise the current head position in the direction of the normal 109 while maintaining the fixed head height 190. The period of time over which the revising is done is configurable, but may be such that revising the head position is not done so quickly as to create a jarring user experience as the head position shifts. Further, the head correction may continue until the corrected head position is within a configurable head reset threshold. The head reset threshold 1602 is illustrated in FIG. 16 and may be configured at the same time as the head position threshold 1008 is configured. As shown in FIG. 16, the head reset threshold 1602 may be centered around the normal 109 and concentric with, but smaller than, the head position threshold 1008. Thus, if a head position exceeds the head position threshold 1008, the device may continue correcting the head position until the head position is within the head reset threshold 1602. Alternatively, the head reset threshold 1602 may be centered around the estimated head reference position 1006 in situations where the head position threshold 1008 stays fixed with the head position (as illustrated in FIGS. 13A and 13B). In such a situation, the device may continue correcting the head position until the normal is within the head reset threshold 1602. The head reset threshold 1602 may also be configured as a certain distance from the normal, where the head position is corrected until the distance between the corrected head position and the normal is less than that certain distance.

Figure 17:
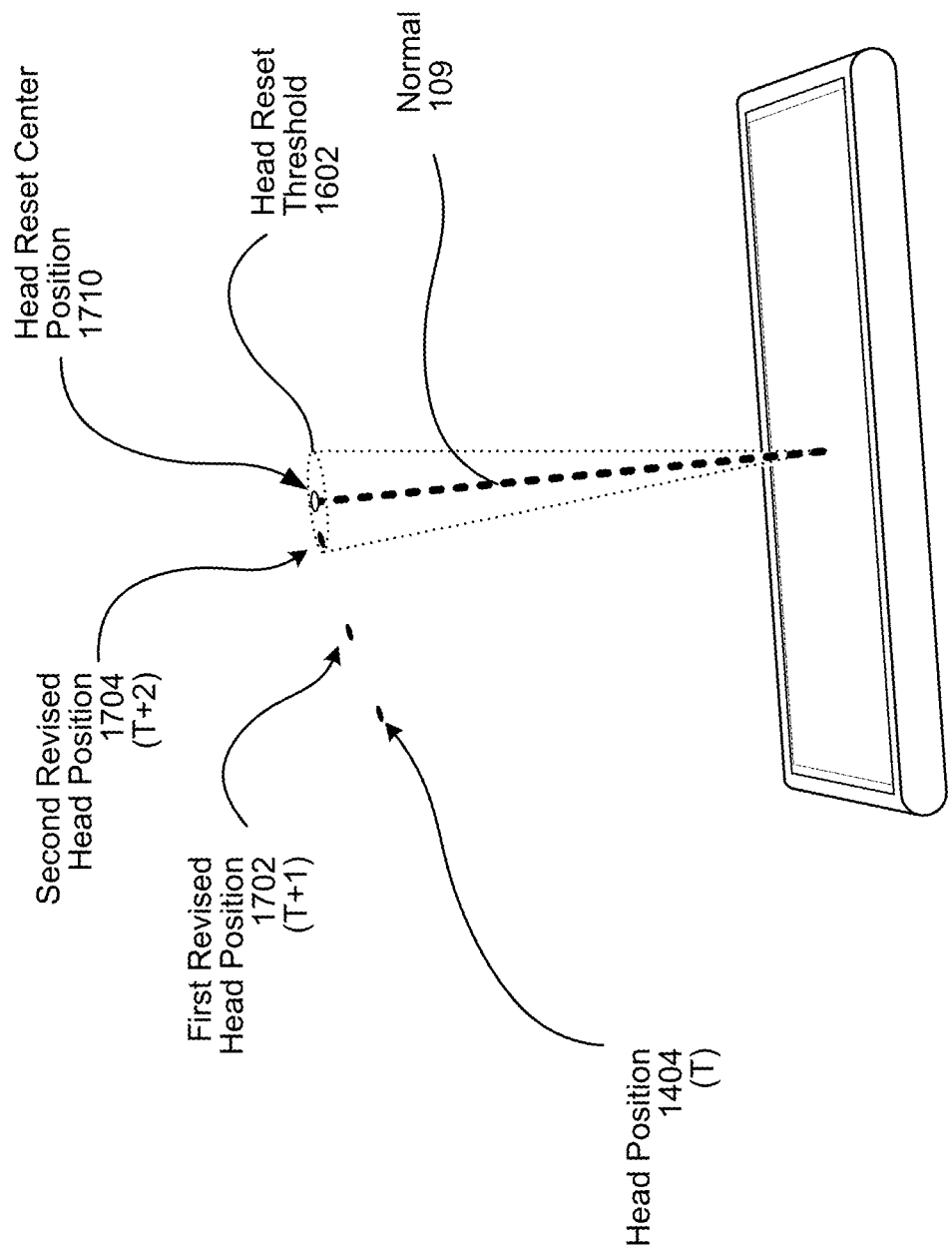
FIGS. 17-18 illustrates revised head positions relative to a head reset threshold according to various embodiments.
Figure 18:
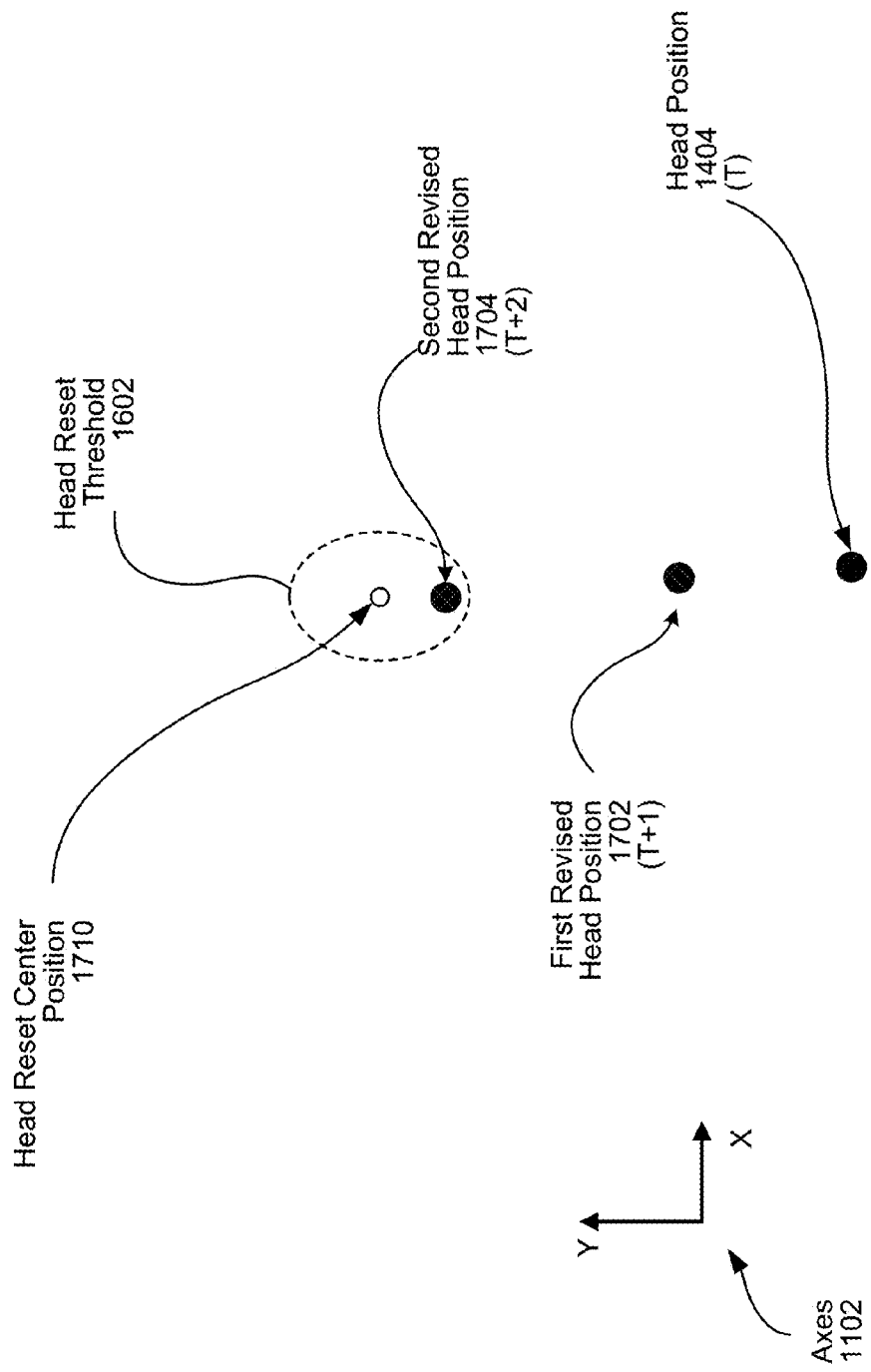

An example of this is illustrated in FIGS. 17 and 18. A head position 1404 at time T is shown in FIG. 17. As this position is outside the head position threshold (as shown in FIG. 15), the device 104 may correct his head position toward the top of normal 109, indicated as the head reset center position 1710. Thus, at time T+1, the device may correct the head position to be at the first revised head position 1702. Then at time T+2 the device may correct the head position to be at the second revised head position 1704. As the second revised head position 1704 is within the head reset center position 1710, the device may now cease correction of the head position and continue operation as normally, thus tracking device movement to alter the head position.

For purposes of illustration, FIGS. 17 and 18 assume that the device 104 is stationary between times T and T+2. During runtime, however, the device may be moving while correcting the head position toward the head reset center position 1710. If movement is detected, the device may update the current head position due to movement of the device between the current time and the previous time, and then may correct that position toward the head reset center position 1710. Thus at each individual time the device determines a direction between the current position and the head reset center position 1710 and adjust the current position in that direction. This process may continue incrementally until the corrected head position is within the head reset threshold 1602. As can be appreciated, this may result in a slightly jittery correction of the head position, as movement between times may cause the path of corrected head positions to not occur on a straight line.

The size of the correction of each position, and thus the speed at which the head is corrected to a position from outside the head position threshold 1008 to within the head reset threshold 1602, may depend on how far away from the head reset center position 1710 each head position is. For example, if a head position is a large distance away from the head reset center position 1710, the device will issue a larger correction than if the head position is a shorter distance away from the head reset center position 1710 (though still outside the head reset threshold 1602). Thus the speed of correction may be non-linear, with large distance corrections completed in a certain time period when the head position is farther away from the head reset center position 1710 but small distance corrections completed in the same time period when the head position is closer to the head reset center position 1710. The overall time to complete the correction may vary, or may be consistent across corrections due to the size of the individual corrections decreasing as the head position approaches the head reset center position 1710.

The head reset threshold 1602 and head position threshold 1008 are configurable and may vary in size and shape. The configuration of the individual thresholds may be determined using machine learning techniques (such as those detailed above) to determine which configurations lead to the best user experience. Further, different thresholds may be used during different device operating conditions.

It may be desirable during device operation to reset the device reference position and estimated head reference position. The reference positions may be reset upon device power up, upon resuming operation from a sleep mode, upon activation of an application or OS operation that relies on head position, etc. The reference positions may also be reset upon expiration of a timer. For example, the reference positions may be considered stale after a certain period of time and thus reset after the time expires. The timer may begin when the reference positions are set. The timer may reset when the reference positions are reset. Or the timer may reset upon new device movement, thus resulting in the timer being linked to a stationary period of the device. Other reset examples are also possible.

Figure 19:
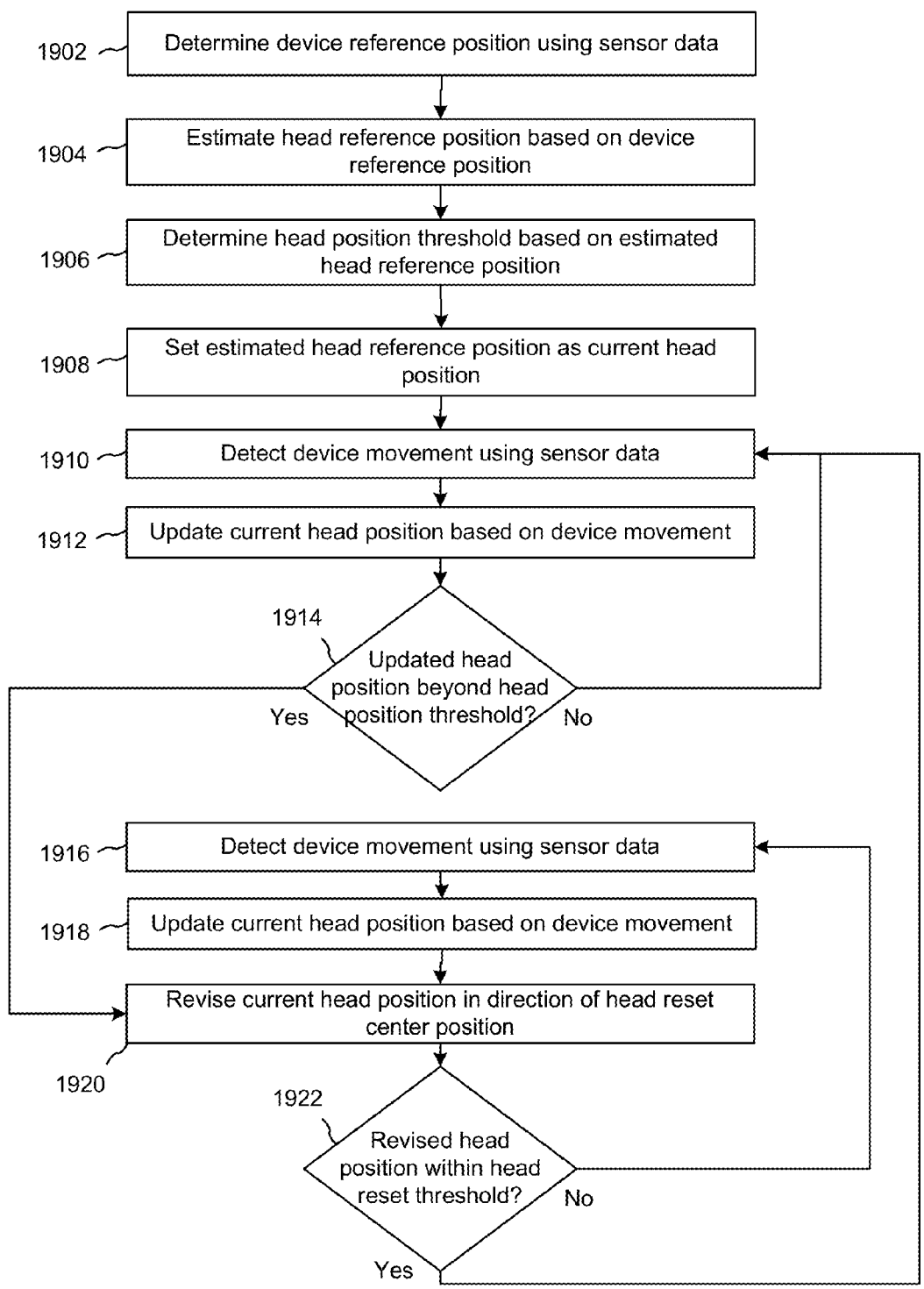
FIG. 19 is an example of a method for implementing an algorithm for estimating a head position in accordance with various embodiments.

A device may operate sensor based head tracking as illustrated in FIG. 19. As shown in FIG. 19, a device may determine (1902) a device reference position using sensor data. The device may then estimate (1904) a head reference position based on the device reference position, as discussed above and in reference to FIGS. 10A-10B. The device may also determine (1906) a head position threshold based on the estimated head reference position, as discussed above and in reference to FIGS. 10C-11. The device may then set (1908) the estimated head position as the current head position and track the head as it moves relative to the device. To track the head, the device detects (1910) device movement using data from sensors of the device. The device then updates (1912) the current head position relative to the device based on the device movement. The device then checks (1914) if the updated head position is beyond the head position threshold. If it is not (1914—No) (for example as discussed above and in reference to FIGS. 12 and 13), the device continues to detect movement and update the head position. If the head position is beyond the head position threshold (1914—Yes) (for example as discussed above and in reference to FIGS. 14-15 and 17-18), the device revises (1920) the current head position in the direction of the head reset center position.

The device then checks (1922) if the revised position is within the head reset threshold. If it is not (1922—No), the device detects (1916) device movement, updates (1918) the current head position based on device movement, and revises (1920) the current head position in the direction of the head reset center position (for example as discussed above in reference to position 1702 in FIGS. 17 and 18). If the new revised position is within the head reset threshold (1922—Yes), the device resumes normal head tracking (for example as discussed above in reference to position 1704 in FIGS. 17 and 18).

Figure 20:
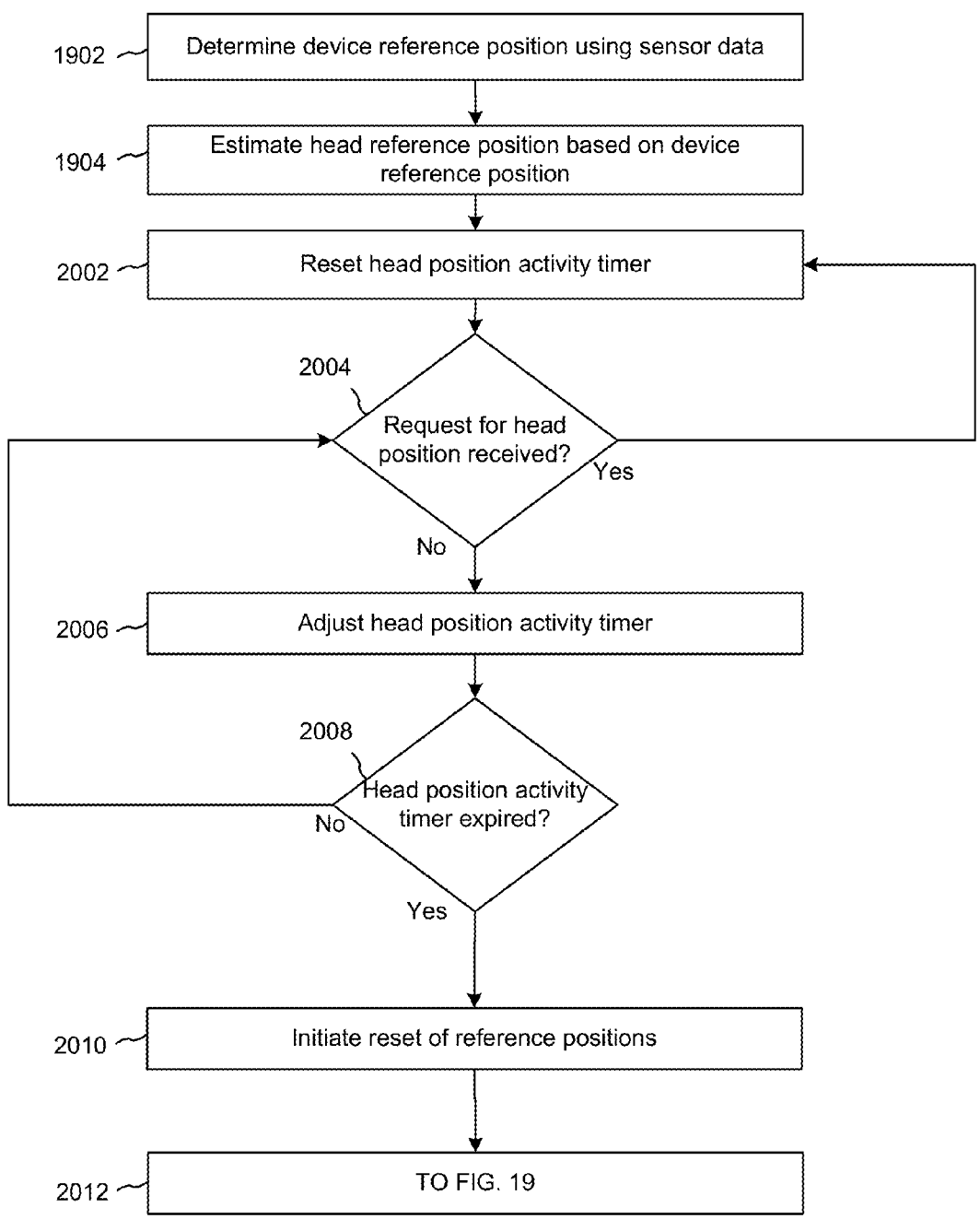
FIG. 20 is an example of a method for resetting an estimating a head position in accordance with various embodiments.

FIG. 20 illustrates operation of a timer that may determine when to reset a device reference position and estimated head reference position to avoid the reference positions becoming stale. As shown, a device may determine (1902) a device reference position using sensor data. The device may then estimate (1904) a head reference position based on the device reference position. The device may then reset (2002) a head position activity timer. The device then checks (2004) to see if a request for head position was received. If a request was received (2004-Yes), the device resets (2002) the timer. If a request was not received (2004—No) the device adjust (2006) the head position activity timer, for example counting the timer down. The device then checks (2008) to see if the timer has expired. If not, (2008—No), the device continues to check (2004) if a request for head position was received. If the head activity timer does expire (2008—Yes), the device may initiate (2010) reset of the reference positions and begin again (2012) to track the head as indicated in FIG. 19.

Figure 21:
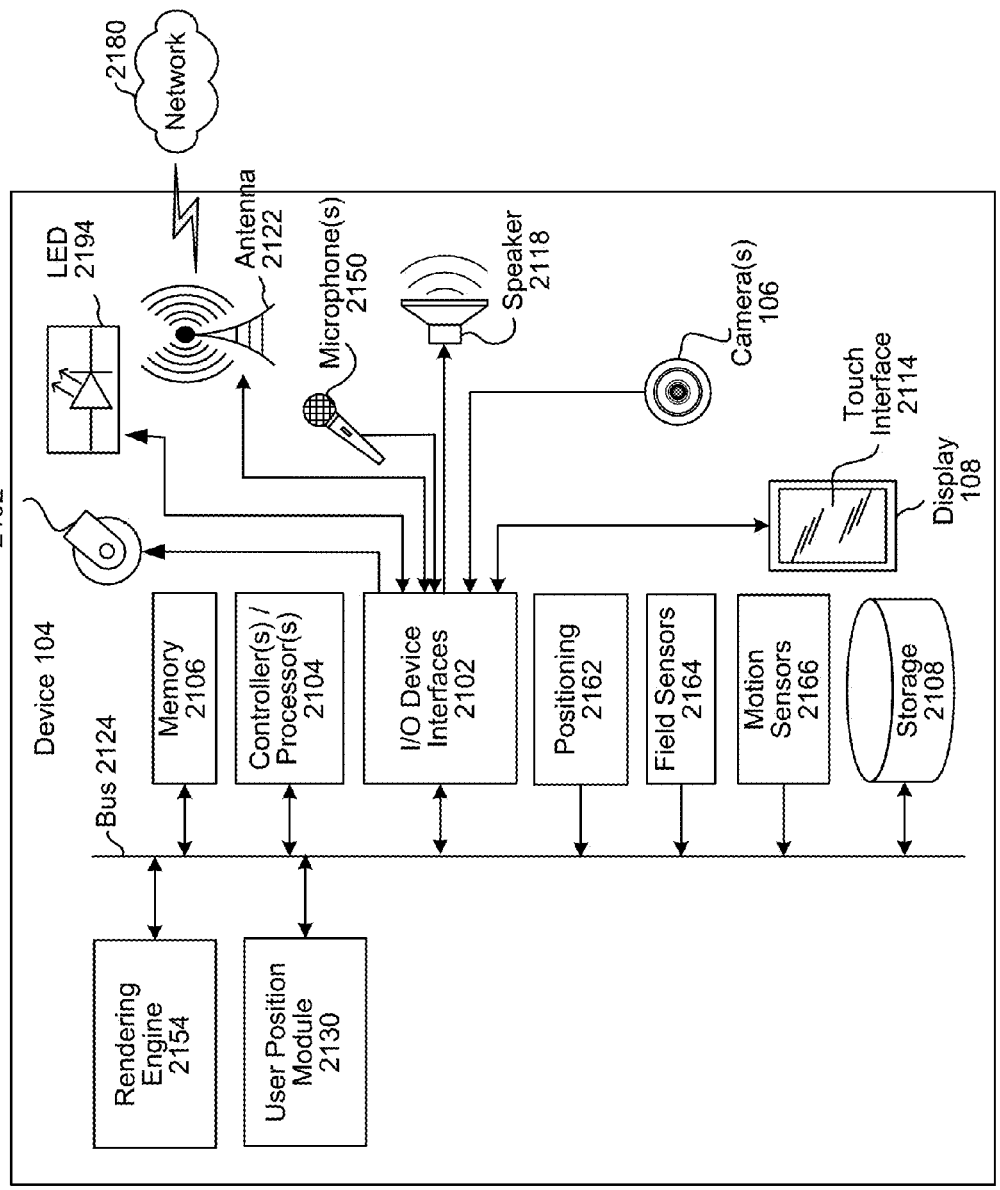
FIG. 21 is an example block diagram conceptually illustrating example components of a device in accordance with various embodiments.

FIG. 21 illustrates a block diagram conceptually illustrating components of a system to perform the steps described herein. Depending upon how the system is structured, some of components shown in FIG. 21 as part of a device 104 may be included in one or more other devices. In operation, the system may include computer-readable and computer-executable instructions that reside in storage 2108 on the device 104. The device 104 may be a mobile device, such as a smart phone, tablet, smart watch, or the like.

The device 104 may include one or more controllers/processors 2104 comprising one-or-more central processing units (CPUs) for processing data and computer-readable instructions, and a memory 2106 for storing data and instructions. The memory 2106 may include volatile random access memory (RAM), non-volatile read only memory (ROM), non-volatile magnetoresistive (MRAM) and/or other types of memory. The device 104 may also include a data storage component 2108 for storing data and processor-executable instructions. The data storage component 2108 may include one or more non-volatile storage types such as magnetic storage, optical storage, solid-state storage, etc. The device 104 may also be connected to a removable or external non-volatile memory and/or storage (such as a removable memory card, memory key drive, networked storage, etc.) through the input/output device interfaces 2102.

Executable instructions for operating the device 104 and its various components may be executed by the controller(s)/processor(s) 2104, using the memory 2106 as temporary "working" storage at runtime. The executable instructions may be stored in a non-transitory manner in non-volatile memory 2106, storage 2108, or an external device. Alternatively, some or all of the executable instructions may be embedded in hardware or firmware in addition to or instead of software.

As shown in FIG. 21, the device 104 may include one or more of a variety of sensors. Among the sensors are an audio capture component such as microphone(s) 2150, an image and/or video capture component such as camera(s) 106, a touch interface 2114, an antenna 2122, positioning sensors 2162, field sensors 2164 (e.g., a 3-axis magnetometer, a gravity sensor), and motion sensors 2166 (e.g., a 3-axis accelerometer, a 3-axis gyroscope). The device 104 may also include one or more buttons (not shown). Several of each of these components may be included. Also, although shown as integrated within device 104, some or parts of the various sensors may be external to device 104 and accessed through input/output device interfaces 2102 either wirelessly or through a physical connection.

The antenna 2122 and related components (e.g., radio transmitter/receiver/transceiver, modem, etc.) may be configured to operate with a wireless local area network (WLAN) (such as WiFi), Bluetooth, and/or wireless networks, such as a Long Term Evolution (LTE) network, WiMAX network, 3G network, etc.

The audio capture component may be, for example, a microphone 2150 or array of microphones, a wired or wireless headset (not illustrated), etc. If an array of microphones is included, approximate distance to a sound's point of origin may be performed acoustic localization based on time and amplitude differences between sounds captured by different microphones of the array.

The touch interface 2114 may be integrated with a surface of a display 108 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The positioning module 2162 provides an interface for acquiring location information, such as information from satellite geographic positioning system(s). For example, the positioning module 2162 may include a Global Positioning System (GPS) receiver and/or a Global Navigation Satellite System (GLONASS) receiver. The positioning module 2162 may also acquire location-based information using other radio sources (e.g., via antenna 2122), such as mapping services that triangulate off of known WiFi service set identifiers (SSIDs) or cellular towers within range of the device 104.

The field sensor module 2164 provides directional data. The field sensor module 2164 may include a 3-axis magnetometer that measures magnetic fields and may serve as a compass. The field sensor module 2164 may also include a dedicated gravity sensor to determine up-and-down.

The motion sensor module 2166 provides inertial data, and may include 3-axis accelerometer and a 3-axis gyroscope.

Examples of other sensors that may be configured on the device include an electronic thermometer to measure ambient temperature and a proximity sensor to detect whether there is an object within a certain distance of the device 104.

Sensors may be communicatively coupled with other components of system via input/output (I/O) device interfaces 2102 and/or via an address/data bus 2124. The address/data bus 2124 conveys data among components of the device 104. Each component within the device 104 may also be directly connected to other components in addition to (or instead of) being connected to other components across the bus 2124.

The I/O device interfaces 2102 may connect to a variety of components and networks. Among other things, the I/O device interfaces 2102 may include an interface for an external peripheral device connection such as universal serial bus (USB), FireWire, Thunderbolt or other connection protocol. The input/output device interfaces 2102 may also support a variety of networks via an Ethernet port and antenna 2122.

The device 104 may also include a video output component for displaying images, such as display 108. The video output component may be a display of any suitable technology, such as a liquid crystal display, an organic light emitting diode display, electrophoretic display, electrowetting display, an electrochromic display, a pico projector, etc. The video output component may be integrated into the device 104 or may be separate.

The device 104 may also include an audio output component such as a speaker 2118, a wired or wireless headset (not illustrated). Other output devices include a haptic effect generator 2192. The haptic effect generator may be of any haptic technology, including technologies to vibrate the entire device 104 (e.g., electromagnetic technologies such as vibratory motor or a coil with a central mass) and/or may comprise technologies allowing the haptic effect to be localized to a position of the touch interface 2114, such as electroactive polymers, piezoelectrics, electrostatics, subsonic audio wave surface actuation, etc. The device may also include an LED 2194 or other light emitting component to provide other visual feedback to a user other than that provided through display 108.

As discussed above, device 104 includes controller(s)/processors 2104, memory 2106, and storage 2108. In addition, the device 104 may include a user position module 2130 and a rendering engine 2154, each of which may comprise processor-executable instructions stored in storage 2108 to be executed by controller(s)/processor(s) 2104 (e.g., software, firmware), hardware, or some combination thereof. For example, components of the user position module 2130 or rendering engine 2154 may be part of a software application running in the foreground and/or background on the device 104. The rendering engine 2154 actually renders, as in generates the appearance of, a graphical user interface. The rendering engine 2154 may render UI elements based on the user position as determined by the user position module 2130. The user position module 2130 may utilize the camera(s) 106 or sensors to estimate a head of the selected user relative to the device 104 as discussed above.

As noted above, depending upon how the system is structured, other components not shown in FIG. 21 may be included as part of the device 104 certain components shown in FIG. 21 as part of a device 104 may be included in one or more other devices.

The various aspects can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most aspects utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In aspects utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of aspects, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate aspects may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various aspects.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A device comprising:
   a gyroscope;
   a display;
   at least one processor;
   a memory component including instructions operable to be executed by the at least one processor to cause the device to:
   receive first gyroscope data from the gyroscope;
   establish a device reference position using the first gyroscope data;
   determine a normal of the device, wherein the normal is a line perpendicular to the display and extends from a display center at a center of the display;
   determine an estimated reference head position relative to the device reference position, wherein the estimated reference head position is a first distance from the display center in a first direction along the normal at the device reference position;
   receive second gyroscope data from the gyroscope, the second gyroscope data indicating rotation of the device to a second device position;
   determine a revised head position relative to the second device position, wherein the revised head position is the first distance from the center of the display in a second direction, where the second direction is different from the first direction;
   determine a head movement distance between the estimated reference head position and the revised head position;
   determine that the head movement distance is beyond a head movement threshold distance;
   determine, based on the revised head position, a second revised head position, wherein:
   the revised head position is a first offset distance from a reset position,
   the second revised head position is a second offset distance from the reset position,
   the second offset distance is less than the first offset distance, and
   the reset position is located the first distance away from the display center along the normal when the device is in the second device position; and display a user interface on the display, wherein the user interface is based on the second revised head position.

2. The device of claim 1, wherein the instructions to cause the device to compare the revised head position to the head position threshold comprise instructions to:
  determine a revised head vector, wherein the revised head vector extends from the display center to the revised head position and has a magnitude equal to the first distance;
  determine an angle between the revised head vector and the normal; and
  compare the angle to a head position threshold angle to determine the angle is greater than the head position threshold angle.

3. The device of claim 1, wherein the instructions further cause the device to:
  determine a reset threshold distance, wherein:
    the reset threshold distance is measured from the reset position, and
    the head position threshold distance is larger than the reset threshold distance;
  compare the second revised head position to the reset threshold;
  determine that the second offset distance is greater than the reset threshold distance; and
  determine, based on the second revised head position, a third revised head position, wherein:
    the third revised head position is a third offset distance from the reset position,
    the third offset distance is less than the second first offset distance by a correction distance, and
    the correction distance is based on a distance from the second revised head position to the reset position.

4. A device comprising:
  a motion sensor;
  a display;
  at least one processor;
  a memory component including instructions operable to be executed by the at least one processor to cause the device to:
    receive first sensor data from the motion sensor;
    determine a device reference position using the first sensor data;
    determine an estimated head position, wherein the estimated head position is a first distance, in a first direction, from the display at the device reference position;
    receive second sensor data from the motion sensor, the second sensor data associated with movement of the device to a second device position;
    determine a revised head position relative to the second device position, wherein the revised head position is in a second direction relative to the display, where the second direction is different from the first direction;
    determine a second distance between the estimated head position and the revised head position;
    determine that the second distance is beyond a first threshold distance;
    determine, based on the revised head position, a second revised head position, wherein:
      the revised head position is a third distance from a reset position,
      the second revised head position is a fourth distance from the reset position, and
      the fourth distance is less than the third distance; and
    display a user interface on the display, wherein the user interface is based at least in part on the second revised head position.

5. The device of claim 4, wherein the instructions further cause the device to determine a normal of the device, wherein the normal is a line perpendicular to the display and extends from a display center at a center of the display, wherein:
  the normal intersects with the estimated head position when the device is at the device reference position, and
  the normal intersects with the reset position when the device is at the second device position.

6. The device of claim 5, wherein the reset position is the first distance from the display.

7. The device of claim 4, wherein:
  the instructions that cause the device to determine the revised head position cause the device to determine the revised head position to be the first distance from the display; and
  the instructions that cause the device to determine the second revised head position cause the device to determine the second revised head position to be the first distance from the display.

8. The device of claim 4, wherein the instructions further cause the device to:
  determine a normal of the device, wherein the normal is a line perpendicular to the display and extends from a point on the display;
  determine a revised head vector, wherein the revised head vector extends from the point to the revised head position and has a magnitude equal to the first distance;
  determine an angle between the revised head vector and the normal; and
  compare the angle to a first threshold angle.

9. The device of claim 8, wherein the instructions further cause the device to:
  determine a second threshold distance, wherein the first threshold distance is greater than the second threshold distance;
  determine that the fourth distance is beyond the second threshold distance; and
  determine, using the second revised head position, a third revised head position, wherein the third revised head position is a fifth distance from the estimated head position and the fifth distance is less than the fourth distance by a correction distance.

10. The device of claim 9, wherein the instructions further cause the device to determine the correction distance based on a distance from the second revised head position to the reset position.

11. The device of claim 4, wherein the motion sensor is a gyroscope.

12. The device of claim 4, wherein the instructions further cause the device to:
  determine a time elapsed since receipt of a request for head position;
  determine that the time elapsed is beyond a time threshold;
  receive third sensor data from the motion sensor;
  establish a new device reference position using the third sensor data; and
  determine a new estimated head position, wherein the new estimated head position is the first distance from the display when the device is in the new device reference position.

13. A computer-implemented method comprising:
receiving first sensor data from a motion sensor of a device;
determining a device reference position using the first sensor data;
determining an estimated head position, wherein the estimated head position is a first distance, in a first direction, from a display of the device at the device reference position;
receiving second sensor data from the motion sensor, the second sensor data associated with movement of the device to a second device position;
determining a revised head position relative to the second device position, wherein the revised head position is in a second direction relative to the display, where the second direction is different from the first direction;
determining a second distance between the estimated head position and the revised head position;
determining that the second distance is beyond a first threshold distance;
determining, based on the revised head position, a second revised head position, wherein:
the revised head position is a third distance from a reset position,
the second revised head position is a fourth distance from the reset position, and
the fourth distance is less than the third distance; and
displaying a user interface on the display, wherein the user interface is based at least in part on the second revised head position.

14. The method of claim 13, further comprising determining a normal of the device, wherein the normal is a line perpendicular to the display and extends from a display center at a center of the display, wherein:
the normal intersects with the estimated head position when the device is at the device reference position, and
the normal intersects with the reset position when the device is at the second device position.

15. The method of claim 13, wherein:
determining the revised head position comprises determining the revised head position to be the first distance from the display; and
determining the second revised head position comprises determining the second revised head position to be the first distance from the display.

16. The method of claim 13, further comprising:
determining a normal of the device, wherein the normal is a line perpendicular to the display and extends from a point on the display;
determining a revised head vector, wherein the revised head vector extends from the point to the revised head position and has a magnitude equal to the first distance;
determining an angle between the revised head vector and the normal; and
comparing the angle to a first threshold angle.

17. The method of claim 16, further comprising:
determining a second threshold distance, wherein the first threshold distance is greater than the second threshold distance;
determining that the fourth distance is beyond the second threshold distance; and
determining, using the second revised head position a third revised head position, wherein the third revised head position is a fifth distance from the estimated head position and the fifth distance is less than the fourth distance by a correction distance.

18. The method of claim 17, further comprising determining the correction distance based on a distance from the second revised head position to the reset position.

19. The method of claim 13, wherein the motion sensor is a gyroscope.

20. The method of claim 13, further comprising:
determining a time elapsed since receipt of a request for head position;
determining that the time elapsed is beyond a time threshold;
receiving third sensor data from the motion sensor;
establishing a new device reference position using the third sensor data; and
determining a new estimated head position, wherein the new estimated head position is the first distance from the display when the device is in the new device reference position.

* * * * *